(12) United States Patent
Sonoda et al.

(10) Patent No.: US 7,604,180 B2
(45) Date of Patent: Oct. 20, 2009

(54) CODE PATTERN, PRINTED MATTER, IMAGE GENERATING APPARATUS, IMAGE PROCESSING APPARATUS, IMAGE GENERATING METHOD, AND INFORMATION IDENTIFYING METHOD

(75) Inventors: Takashi Sonoda, Kanagawa (JP); Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/452,467

(22) Filed: Jun. 14, 2006

(65) Prior Publication Data
US 2007/0158420 A1 Jul. 12, 2007

(30) Foreign Application Priority Data
Dec. 26, 2005 (JP) .............................. 2005-373586

(51) Int. Cl.
*G06K 19/06* (2006.01)
(52) U.S. Cl. .................................................... 235/494
(58) Field of Classification Search ................................
235/462.08–462.09, 451, 494
See application file for complete search history.

(56) References Cited

U.S. PATENT DOCUMENTS

| | | | | |
|---|---|---|---|---|
| 5,661,506 A | * | 8/1997 | Lazzouni et al. ............. 345/179 |
| 6,000,613 A | * | 12/1999 | Hecht et al. .................. 235/456 |
| 6,186,405 B1 | * | 2/2001 | Yoshioka ..................... 235/494 |
| 6,641,053 B1 | * | 11/2003 | Breidenbach et al. ........ 235/494 |
| 7,152,805 B2 | * | 12/2006 | Walmsley et al. ............ 235/494 |
| 2003/0117652 A1 | * | 6/2003 | Lapstun ..................... 358/1.18 |
| 2006/0034496 A1 | * | 2/2006 | Silverbrook et al. ........ 382/119 |
| 2006/0049260 A1 | * | 3/2006 | Takahashi et al. ........... 235/454 |
| 2006/0261175 A1 | * | 11/2006 | Angelucci et al. ........... 235/494 |
| 2007/0023523 A1 | * | 2/2007 | Onishi ........................ 235/454 |
| 2007/0090177 A1 | * | 4/2007 | Mitamura .................... 235/375 |

FOREIGN PATENT DOCUMENTS

| | | |
|---|---|---|
| JP | A 9-185669 | 7/1997 |
| JP | B2 2833975 | 10/1998 |
| JP | A 2003-511762 | 3/2003 |
| JP | A 2004-152273 | 5/2004 |
| JP | A-2004-166177 | 6/2004 |
| WO | WO 01/26033 A1 | 4/2001 |
| WO | WO 01/75781 | * 10/2001 |

* cited by examiner

*Primary Examiner*—Daniel A Hess
(74) *Attorney, Agent, or Firm*—Oliff & Berridge, PLC

(57) ABSTRACT

There is provided a code pattern readable by a reader having a given number of dots that are selectively arranged in a block that is an information unit.

4 Claims, 29 Drawing Sheets

FIG. 2A
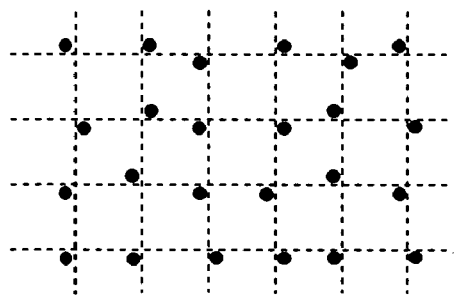
RELATED ART
FIG. 2B
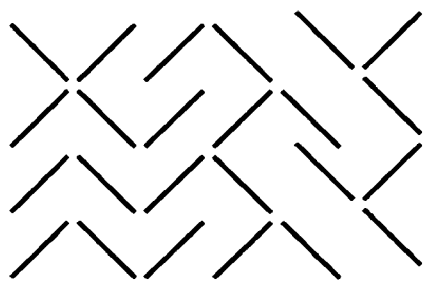
RELATED ART
FIG. 2C
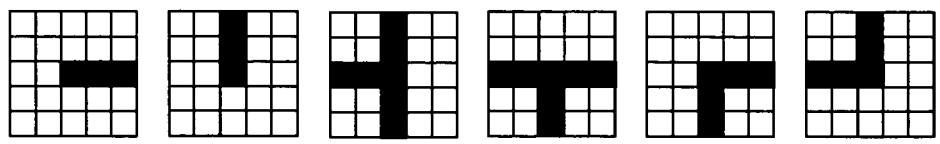
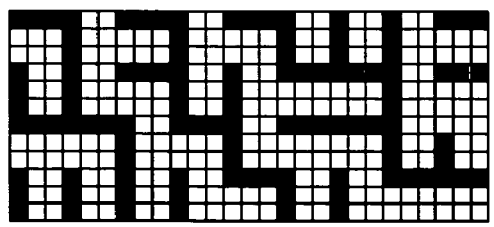
RELATED ART
FIG. 2D
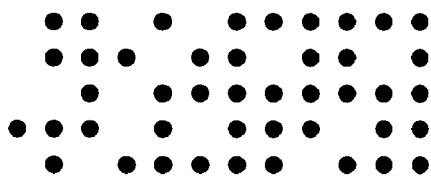
RELATED ART

9C2 METHOD
2 DOTS ARRANGED IN 9 DOT AREAS

DENSITY 5.56%
INFORMATION AMOUNT 0.036BIT/PIXEL

12 PIXELS

INFORMATION AMOUNT IS ALMOST EQUAL TO OF BENCHMARK, BUT DENSITY IS MORE FAVORABLE

9C3 METHOD
3 DOTS ARRANGED IN 9 DOT AREAS

DENSITY 8.33%
INFORMATION AMOUNT 0.071BIT/PIXEL

12 PIXELS

DENSITY IS ALMOST EQUAL TO OF BENCHMARK, BUT INFORMATION AMOUNT IS LARGER

FIG. 5  12 PIXELS

11 PIXELS

FIG. 10A

COMPARISON OF DENSITY

| DENSITY | TOTAL DOTS | 4 | 4 | 6 | 6 | 6 | 9 | 9 | 9 | 9 |
|---|---|---|---|---|---|---|---|---|---|---|
| | INFORMATION DOT | 1 | 2 | 1 | 2 | 3 | 1 | 2 | 3 | 4 |
| AREA SIZE | 4 | 0.250 | 0.500 | 0.250 | 0.500 | 0.750 | 0.250 | 0.500 | 0.750 | 1.000 |
| | 5 | 0.160 | 0.320 | 0.160 | 0.320 | 0.480 | 0.160 | 0.320 | 0.480 | 0.640 |
| | 6 | 0.111 | 0.222 | 0.111 | 0.222 | 0.333 | 0.111 | 0.222 | 0.333 | 0.444 |
| | 7 | 0.082 | 0.163 | | 0.163 | 0.245 | | 0.163 | 0.245 | 0.327 |
| | 8 | | 0.125 | | 0.125 | 0.188 | | 0.125 | 0.188 | 0.250 |
| | 9 | | 0.099 | | 0.099 | 0.148 | | 0.099 | 0.148 | 0.198 |
| | 10 | | | | | 0.120 | | | 0.120 | 0.160 |
| | 11 | | | | | 0.099 | | | 0.099 | 0.132 |
| | 12 | | | | | 0.083 | | | 0.083 | 0.111 |
| | 13 | | | | | | | | | 0.095 |
| | 14 | | | | | | | | | |

FIG. 10B

COMPARISON OF INFORMATION AMOUNT

| INFORMATION AMOUNT | TOTAL DOTS | 4 | 4 | 6 | 6 | 6 | 9 | 9 | 9 | 9 |
|---|---|---|---|---|---|---|---|---|---|---|
| | INFORMATION DOT | 1 | 2 | 1 | 2 | 3 | 1 | 2 | 3 | 4 |
| AREA SIZE | 4 | | | | | | | | | |
| | 5 | | | | | | | | | |
| | 6 | | | | | | | | | |
| | 7 | 0.031 | | | | | | | | |
| | 8 | 0.031 | 0.040 | 0.040 | | | | | | |
| | 9 | 0.025 | 0.032 | 0.032 | 0.039 | | 0.039 | | | |
| | 10 | 0.020 | 0.026 | 0.026 | 0.032 | 0.036 | 0.032 | 0.036 | | |
| | 11 | 0.017 | 0.021 | 0.021 | 0.027 | 0.030 | 0.026 | 0.031 | | |
| | 12 | 0.014 | 0.018 | 0.018 | 0.023 | 0.026 | 0.022 | 0.026 | 0.038 | |
| | 13 | 0.012 | 0.015 | 0.015 | 0.020 | 0.022 | 0.019 | 0.031 | 0.033 | |
| | 14 | 0.010 | 0.013 | 0.013 | | | 0.016 | 0.026 | | 0.036 |

FIG. 11

COMPARISON OF DENSITY AND INFORMATION AMOUNT

| | TOTAL DOTS | 4 | 4 | 6 | 6 | 6 | 9 | 9 | 9 |
|---|---|---|---|---|---|---|---|---|---|
| | INFORMATION DOT | 1 | 2 | 1 | 2 | 3 | 1 | 2 | 3 | 4 |
| AREA SIZE | 4 | | | | | | | | | |
| | 5 | | | | | | | | | |
| | 6 | | | | | | | | | |
| | 7 | BENCH MARK | | PICK 1 | | | | | | |
| | 8 | | | | | | PICK 2 | | | |
| | 9 | | | | | | PICK 3 | | | |
| | 10 | | | | | | | PICK 4 | | |
| | 11 | | | | | | | PICK 5 | | |
| | 12 | | | | | | | PICK 6 | PICK 7 | |
| | 13 | | | | | | | | | |
| | 14 | | | | | | | | | |

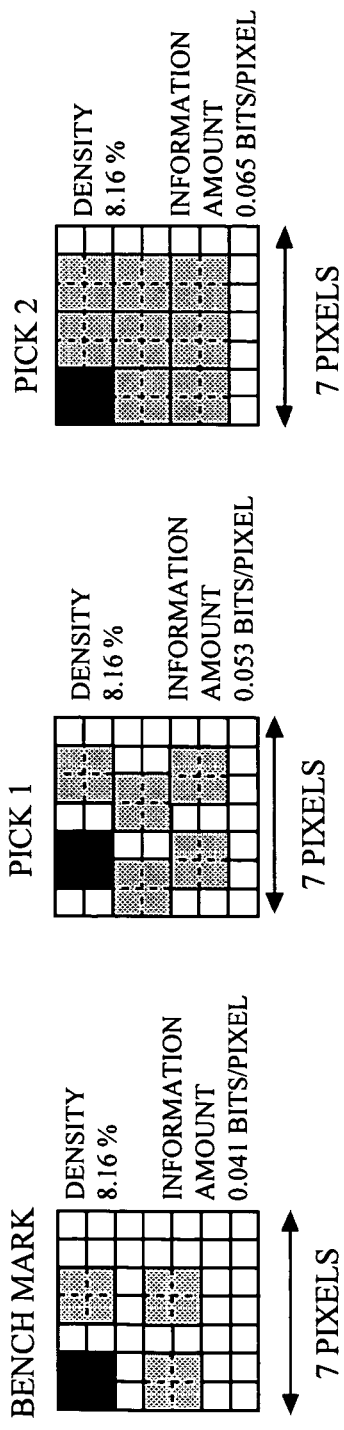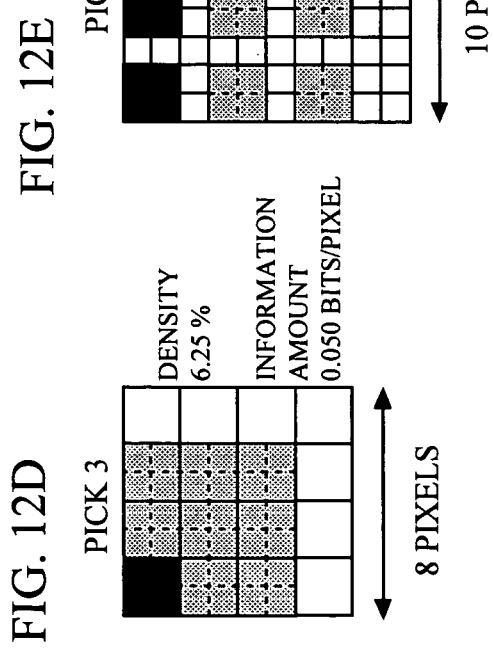

FIG. 13
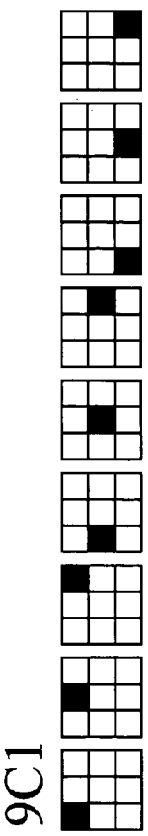
9C1
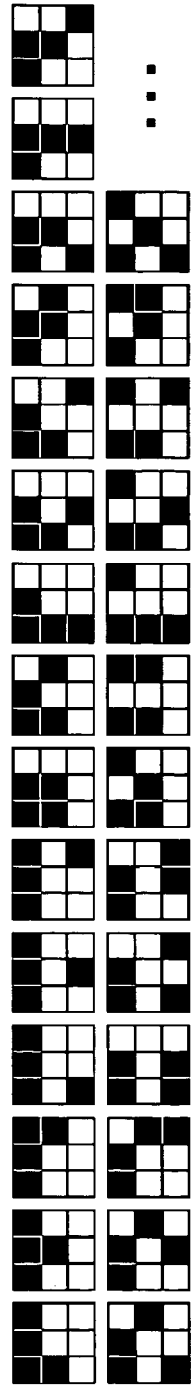
9C4
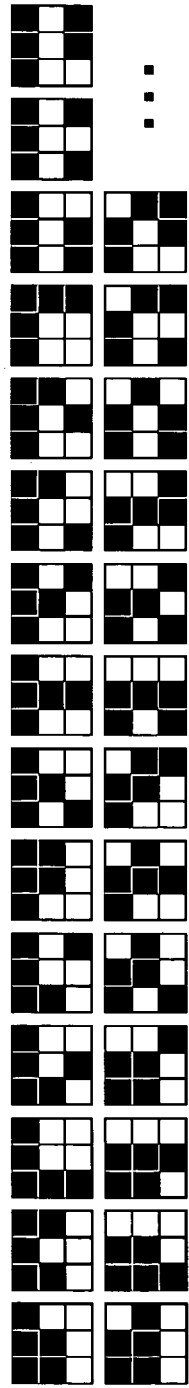
9C5
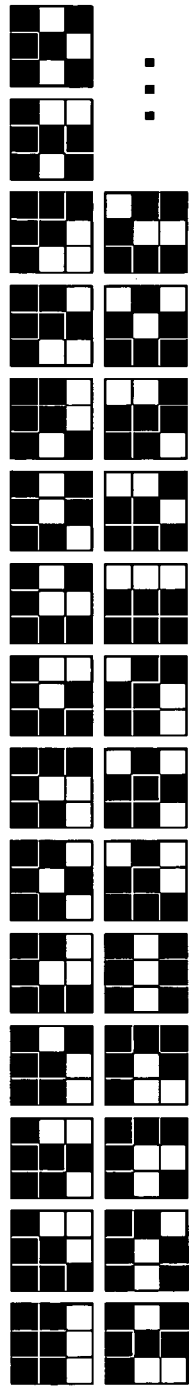
9C6

9C2

9C7

COMPARING 9C7 TO 9C2, THEY ARE IN RELATION OF NEGATIVE AND POSITIVE. THOUGH DENSITY IS INCREASED, EASY DOT DETECTION AND INVULNERABLENESS TO NOISE ARE OBTAINED

MOVEMENT POSITION IN WHICH ALL BLOCK INCLUDES 2 DOTS IS CORRECT FRAME POSITION. IN THIS CASE, BLOCK FRAME IS MOVED 1 DOT RIGHTWARD AND 2 DOTS DOWNWARD

FIG. 21
| 1 | 1 | 9 | 26 | 2 |
|---|---|---|---|---|
| 12 | 27 | 1 | 24 | 0 |
| 11 | 1 | 16 | 17 | 25 |
| 14 | 28 | 30 | 1 | 20 |
| 35 | 7 | 8 | 6 | 0 |
ROTATE IMAGE 90 DEG RIGHTWARD AND SORT PATTERN NUMBERS
| 32 | 15 | 12 | 13 | 0 |
|---|---|---|---|---|
| 4 | 29 | 0 | 24 | 0 |
| 9 | 31 | 17 | 0 | 10 |
| 7 | 0 | 18 | 25 | 27 |
| 1 | 21 | 26 | 1 | 3 |
SEARCH SYNCHRONOUS CODE PATTERN UNITS 32 TO 35. WHEN PATTERN 35 IS DETECTED, IT IS FOUND THAT THE PATTERN IS ROTATED 270 DEG RIGHTWARD
DECODING

CODE PATTERN, PRINTED MATTER, IMAGE GENERATING APPARATUS, IMAGE PROCESSING APPARATUS, IMAGE GENERATING METHOD, AND INFORMATION IDENTIFYING METHOD

CROSS-REFERENCE TO RELATED APPLICATION

This application claims priority under 35 USC 119 from Japanese patent document, 2005-373586, the disclosure of which is incorporated by reference herein.

BACKGROUND

1. Technical Field

The present invention relates to a technology for reading part of a code pattern arranged on a two dimensional surface and identifying a reading position on the two dimensional surface.

2. Related Art

In these years, a technology for uniformly arranging a code pattern on a two dimensional surface, reading a symbol thereof, and thereby identifying a position on the two dimensional surface has been proposed. Various types of code patterns are known.

SUMMARY

The invention provides a code pattern which is inconspicuous and has a high information amount attained by expressing one code unit by multiple dots, a printed matter, an image generating apparatus for generating it, an image processing apparatus for processing the code pattern, an image generating method, and an information identifying method.

According to an aspect of the invention, there is provided a code pattern readable by a reader having a given number of dots that are selectively arranged in a block that is an information unit.

BRIEF DESCRIPTION OF THE DRAWINGS

Embodiments of the present invention will be described in detail based on the following figures, wherein:

FIGS. 2A, 2B, 2C, and 2D are views showing code patterns of related arts;

FIGS. 10A and 10B are diagrams showing change in densities and information amounts when an area size and the number of dots are changed;

FIG. 11 is a diagram showing picks of code pattern units which have an information amount equal to or more than of the bench mark and whose density is lower than of the bench mark;

FIGS. 12A, 12B, 12C, 12D, 12E, and 12F are views showing code pattern units according to an exemplary embodiment of the invention;

FIG. 13 is a view showing code pattern units according to an exemplary embodiment of the invention;

FIG. 21 is a view for explaining a method of rotating a code pattern unit in the correct direction from a synchronous code;

DETAILED DESCRIPTION

First, the following description is given to facilitate the better understanding.

Figure 1:
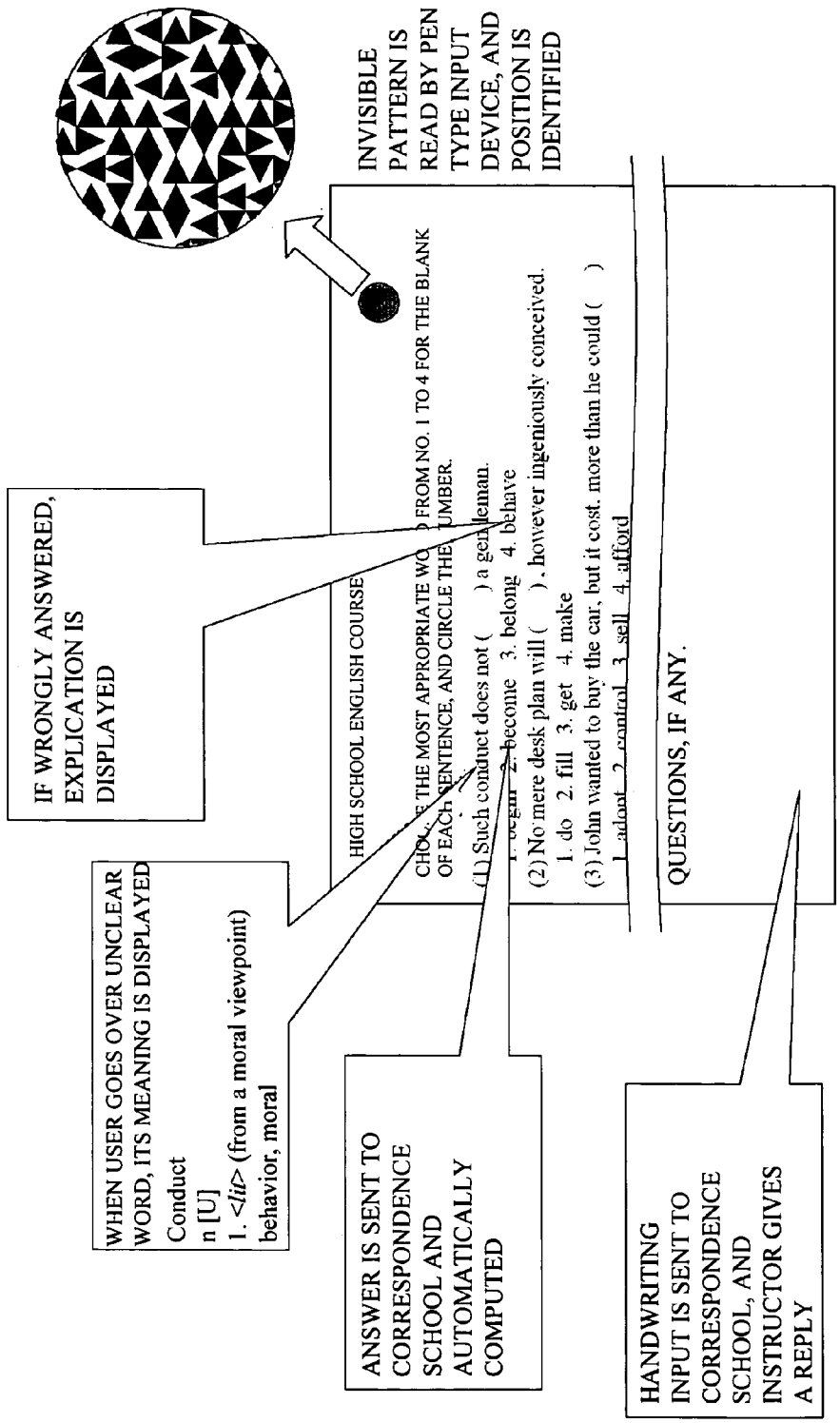
FIG. 1 is a view showing an example of utilizing a technology for identifying a reading position on a two dimensional surface.

A system shown in FIG. 1 uses symbols that are uniformly printed on an examination sheet printed on paper or the like in infrared/ultraviolet absorption invisible ink or toner. When an answerer goes over the selected answer position by a scanner or the like, the selected answer is sent to a correspondence school or the like. The symbols can be printed in visible ink in addition to the invisible ink.

As such a code pattern, various patterns as shown in FIGS. 2A through 2D have been proposed.

Now, a description will be given of embodiments of the present invention with reference to the accompanying drawings.

Embodiment

[Code Pattern Unit]

First, a description will be given of a structure of a code pattern unit. The code pattern unit is recorded as a background image on the sheet. The code pattern unit may be formed from infrared/ultraviolet absorption invisible ink or toner in addition to from visible ink or toner.

Figure 3A:
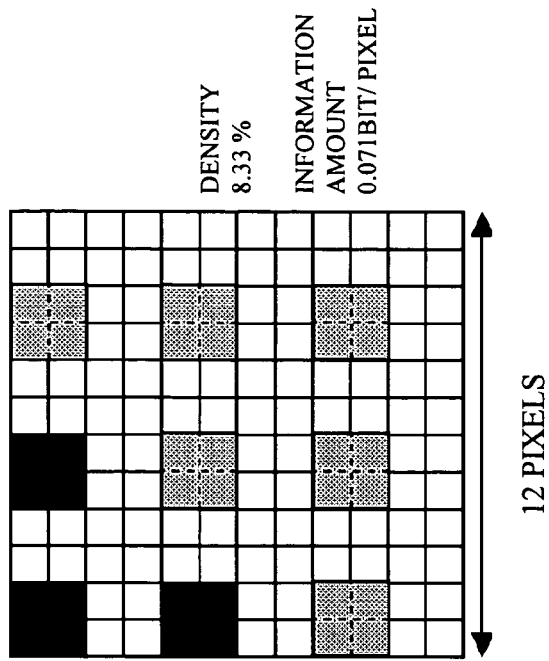
FIGS. 3A and 3B are views showing code pattern units according to an exemplary embodiment of the invention.
Figure 9:
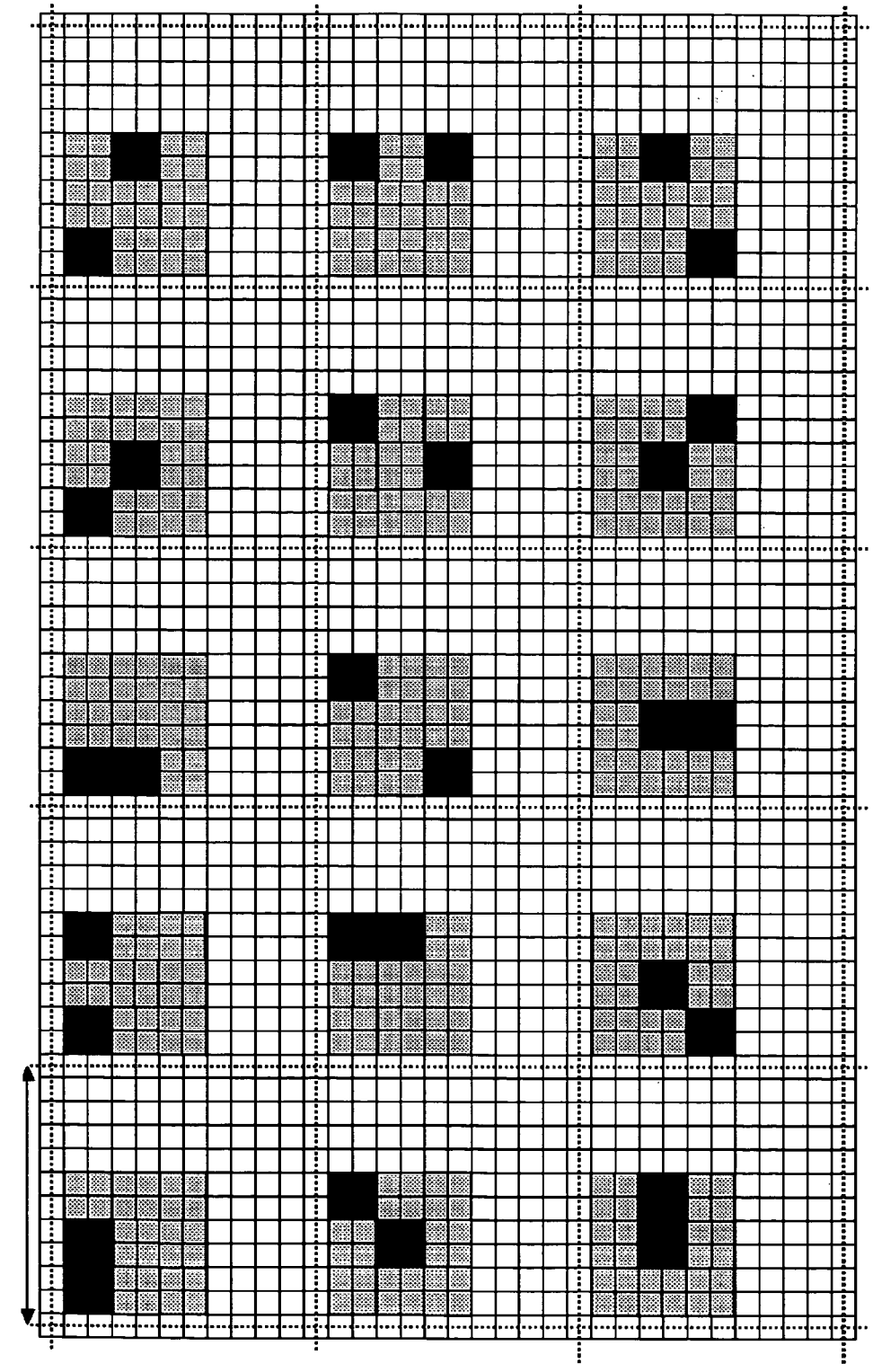
FIG. 9 is an arrangement example of code pattern units of 9C2 method.

In the code pattern unit of this embodiment, as shown in FIG. 3A, 9 dot printing areas are provided in a 12×12 pixel sized block. Information is displayed by selecting 2 from the 9 dot printing areas. Selecting 2 from 9 results in 36 combinations. Therefore, calculating a log with a base of 2 results in about 5.17 bits.

$$_9C_2=36$$

$$Log_2=36 \approx 5.17 \qquad \text{Mathematical formula 1}$$

Figure 4:
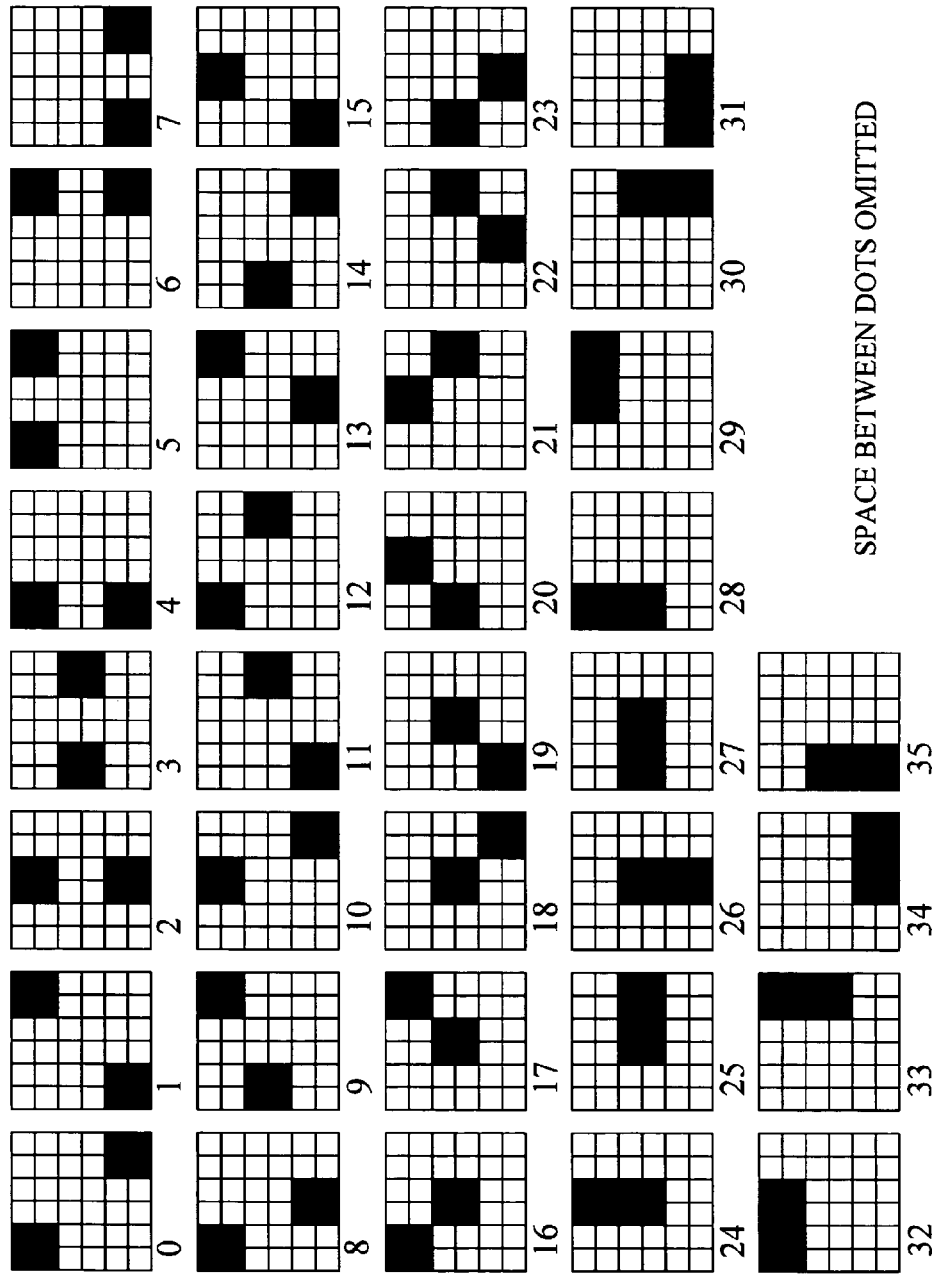
FIG. 4 is a view showing code pattern units and pattern values of 9C2 method.
Figure 5:
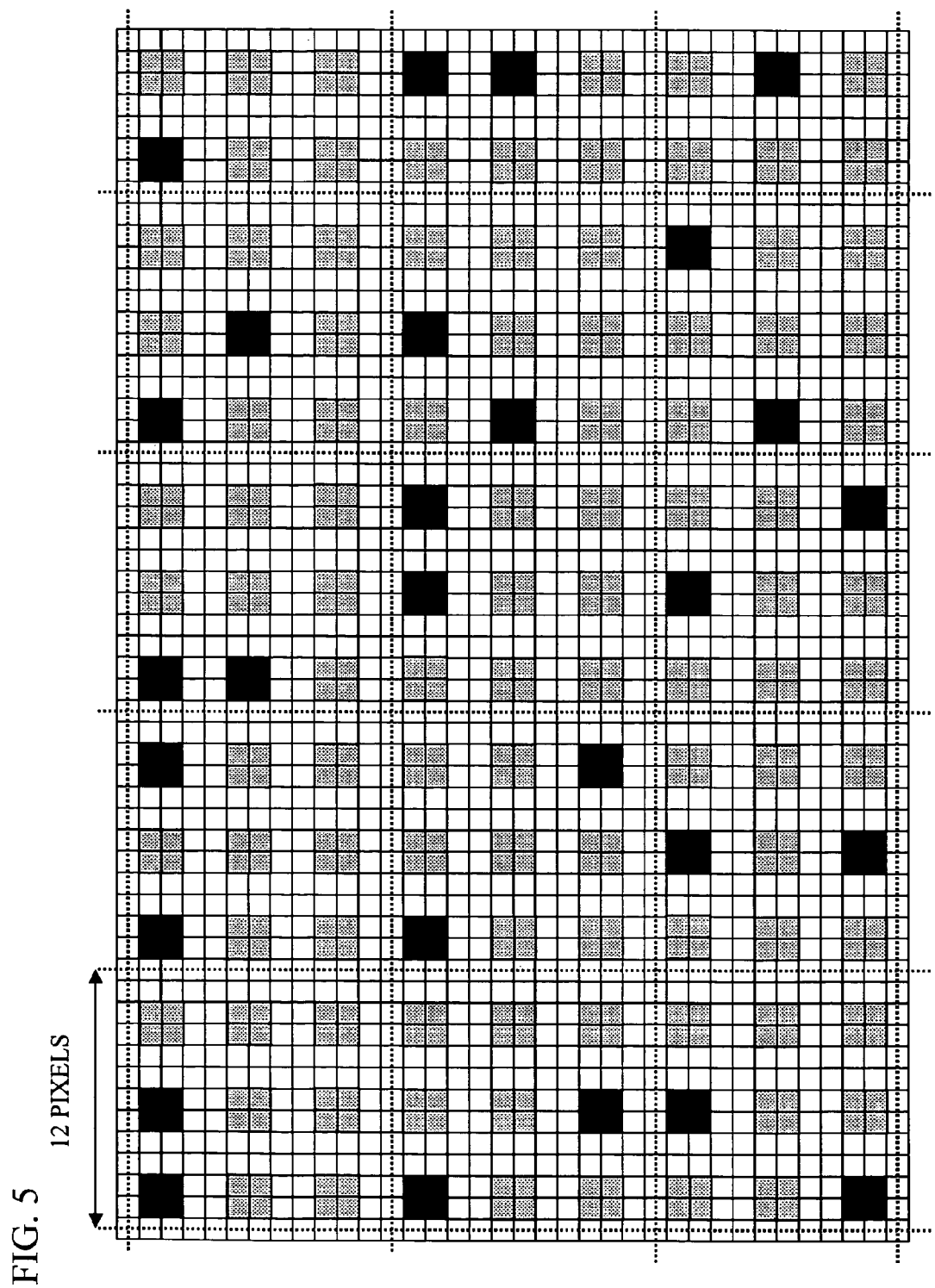
FIG. 5 is a view showing a state that the code pattern units of 9C2 method are arranged.

A 2 pixel space is provided between printing areas. When the code pattern unit is printed by a 1200 DPI printer, each dot is appropriately composed of 2 pixels×2 pixels. The following description will be given of the case using this dot size. However, it is needless to say that the code pattern unit may be expressed by other dot size. In the code pattern unit, 2 pcs of 2×2=4 pixels are buried in 12×12 pixels=144 pixels. Therefore, the density of 1 block becomes 5.56%. Further, the information amount becomes 0.036 bits/pixel resulting from 5.17/144. FIG. 4 shows code pattern units obtained by selecting and combining 2 dots from 9 dot printing areas. The number shown under each block represents a pattern value inherent in each pattern. In FIG. 4, white spaces shown in FIG. 3A are omitted. The number of combinations of selecting 2 from 9 is denoted by mathematical characters, $_9C_2$. Therefore, the code pattern unit will be hereinafter called 9C2. FIG. 5 shows an actual layout using the 9C2 patterns.

As described above, in the code pattern unit of this embodiment, the information is expressed by multiple dots. Thereby, a code pattern unit which is inconspicuous and has a high information amount can be realized. Further, as shown in FIGS. 3A and 3B, since a space is provided between dots, errors can be reduced and the code pattern unit can be read accurately as far as possible.

Figure 3B:
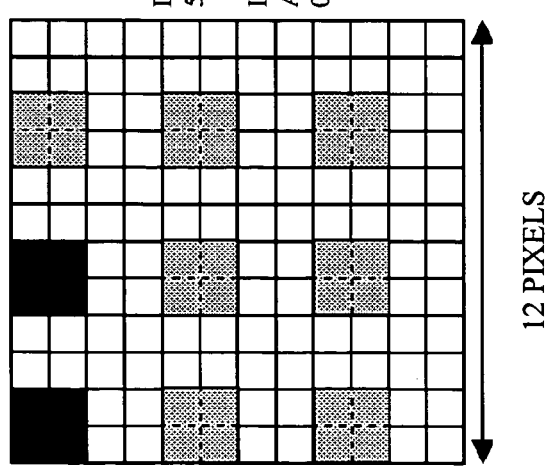
Figure 6:
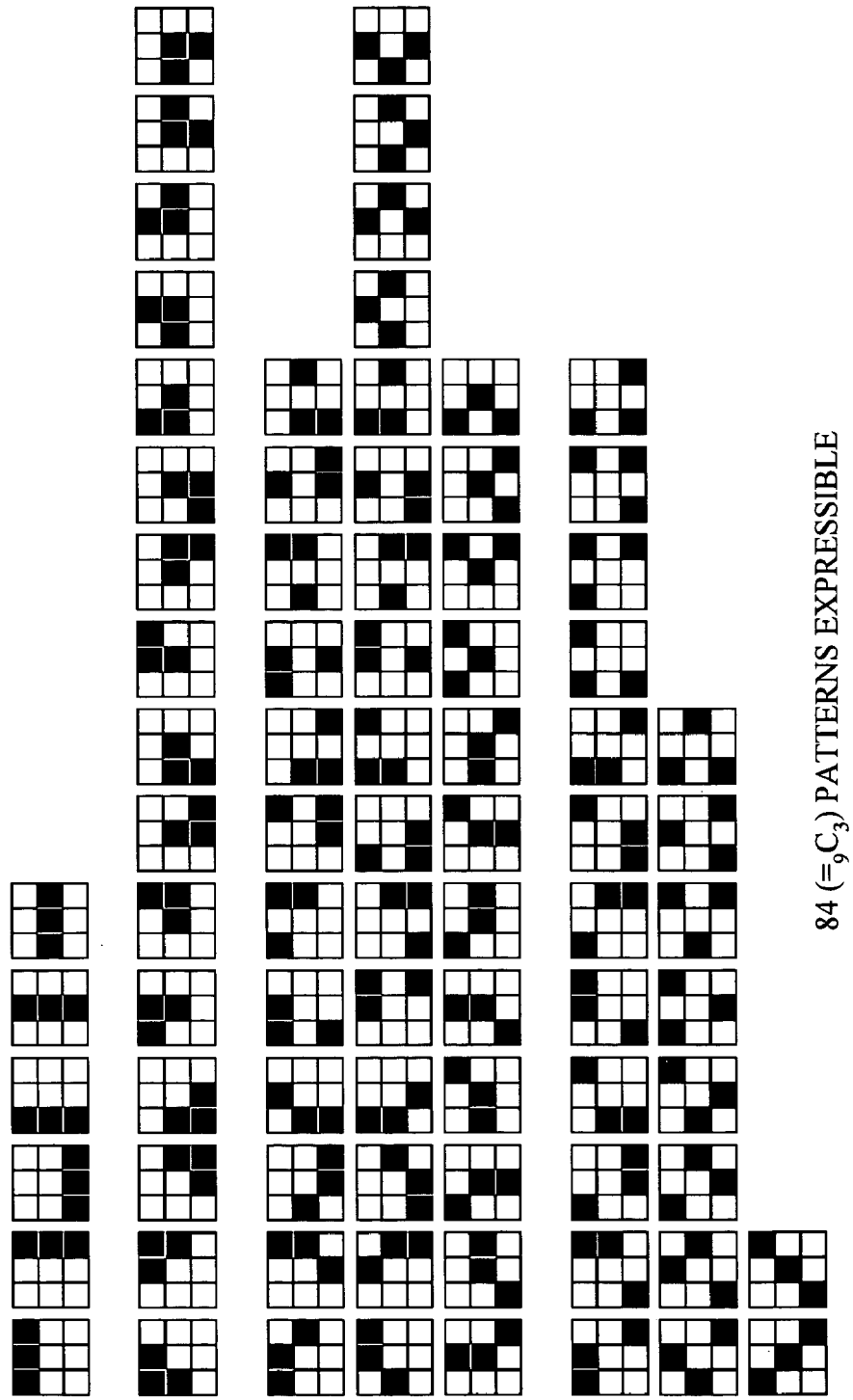
FIG. 6 is a view showing code pattern units of 9C3 method.

As other form of the code pattern unit, as shown in FIG. 3B, it is possible that 3 dots are selected from 9 dot printing areas to obtain dot printing areas. This method will be hereinafter called 9C3 method. In this case, though the density becomes 8.33%, the information amount becomes 0.071 bits/pixel, which means an information amount per 1 pixel can be increased. FIG. 6 shows code pattern units of the 9C3 method. In the 9C3 method, 84 patterns shown in FIG. 6 can be expressed.

Comparison between the code pattern unit of the 9C2 method and the bench mark disclosed in Japanese Patent Application Publication No. 2003-511762 will be hereinafter made.

Figure 7:
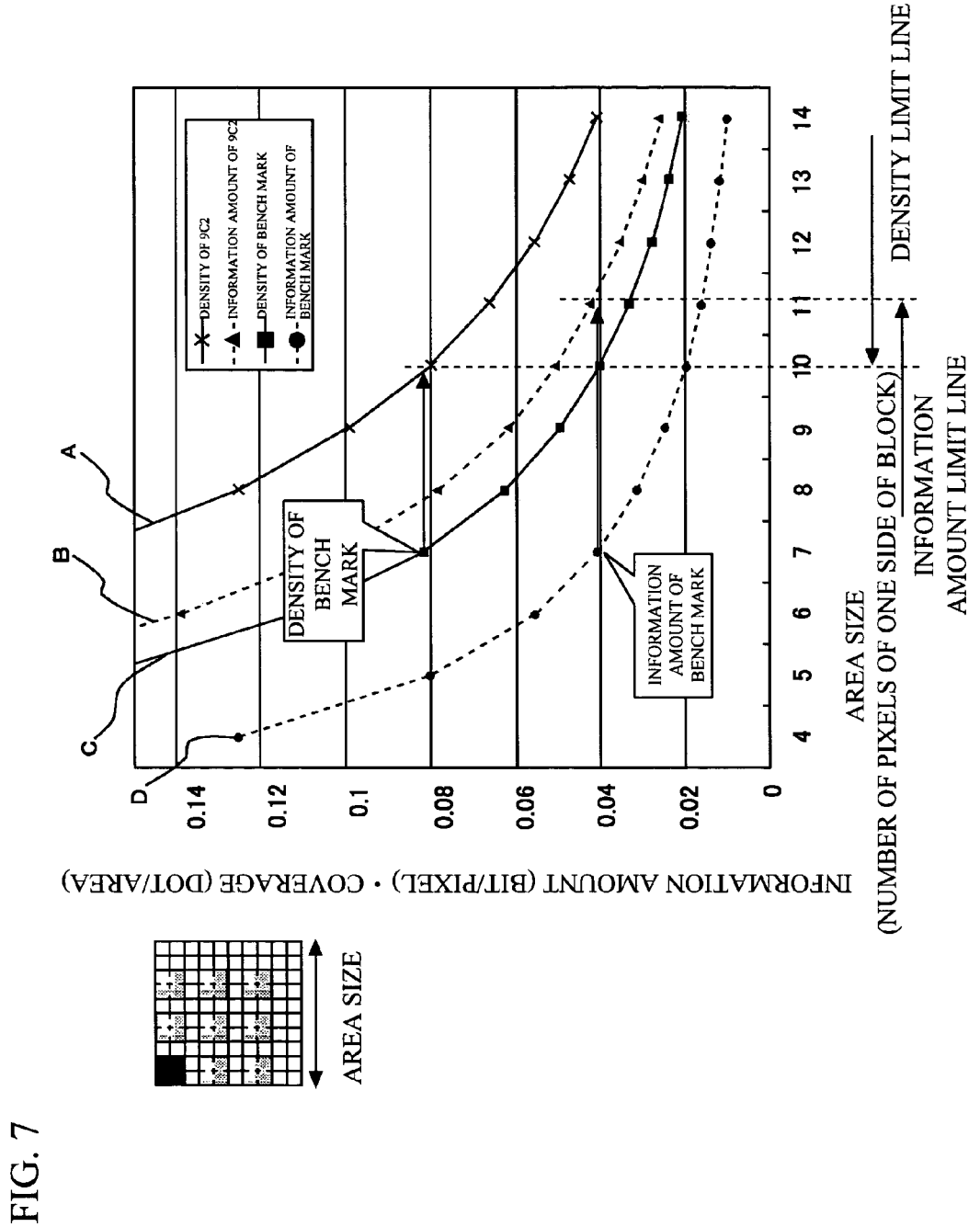
FIG. 7 is a diagram comparing information amounts and densities between a bench mark and 9C2 method.
Figure 8:
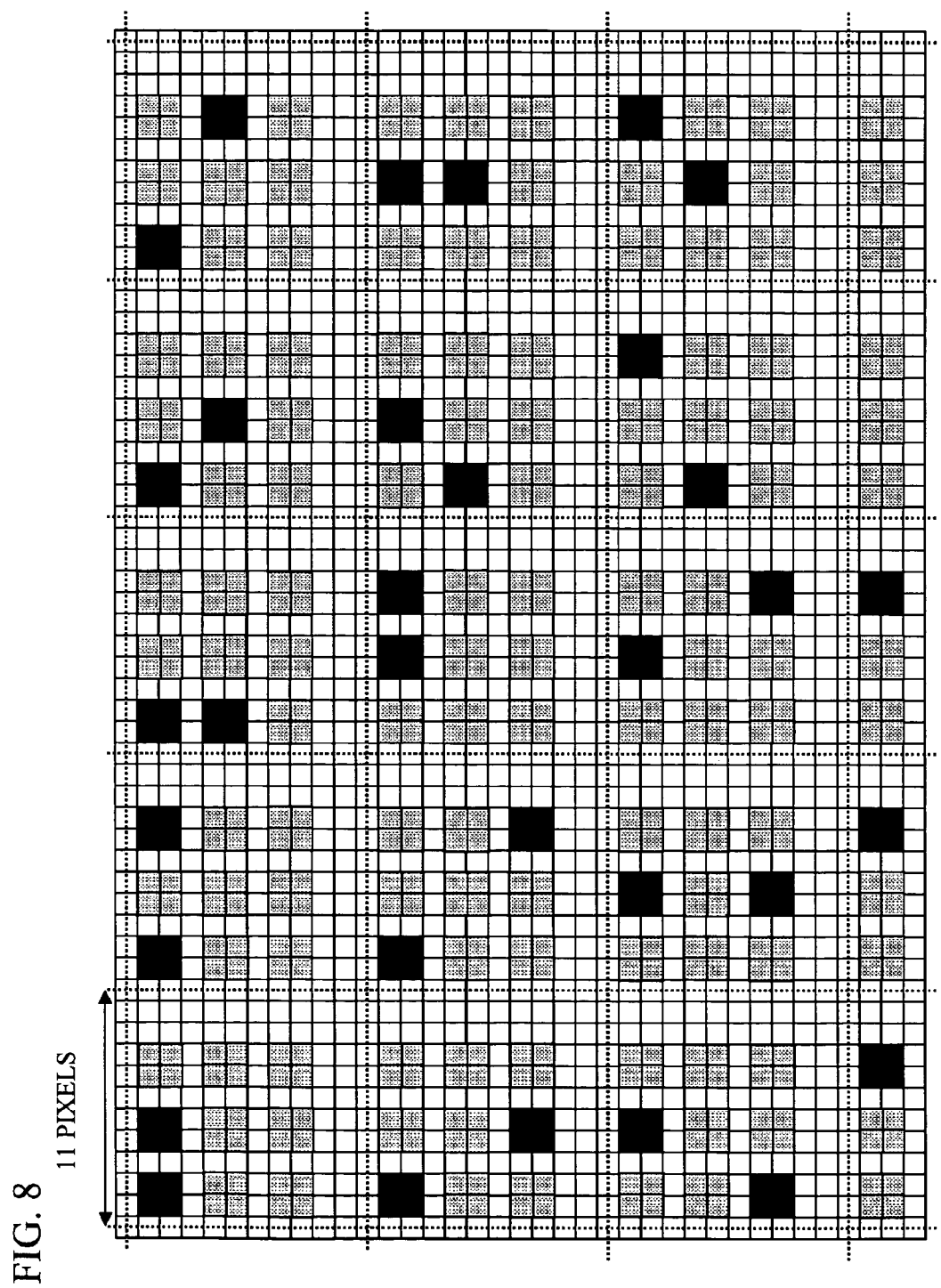
FIG. 8 is an arrangement example of code pattern units of 9C2 method.

A curve A shown in FIG. 7 represents change in the density of the code pattern unit of the 9C2 method when the size of the foregoing block is changed. A curve B represents change in the information amount expressible by the code pattern unit of the 9C2 method when the size of the foregoing block is changed. A curve C represents change in the density in the bench mark when the block size is changed. A curve D represents change in the information amount expressible by the bench mark when the block size is changed. As shown in FIG. 7, by setting the size of 1 block to (10×10) to (11×11), the information amount and the density of the code pattern unit of the 9C2 method can exceed the information amount and the density of the bench mark. However, when the block size is set to (10×10) or (11×11), a space between dots is narrow, and an error may occur in judging dots. FIG. 8 shows a case that 2 dots are printed leaving an 1 pixel space in a 11×11 pixel block. FIG. 9 shows a case that 2 dots are printed without leaving a space in a 11×11 pixel block.

Therefore, in this embodiment, 12×12 pixel block leaving 2 pixels between each dot is used. Thereby, while the expressible information amount and the density can be maintained, judging dots can be accurately performed. When the 12×12 pixel block is used, every space between each dot becomes 2 pixels, resulting in inability of judging block break points. However, judging block break points can be performed after detecting dots instead of in the stage of detecting dots. A method of judging block break points will be described later.

The code pattern unit is not limited to the foregoing patterns, but may be the following patterns. FIGS. 10A and 10B show results of examining a relation among the area (block) size, the total number of dot printing areas, and the number of dots practically printed. FIG. 10A shows a relation to the density, and FIG. 10B shows a relation to the information amount. When FIG. 10A is compared with FIG. 10B, the case in which the density is equal to or less than of the bench mark and the information amount is equal to or more than of the bench mark corresponds to picks 1 to 5 shown in FIG. 11. Code pattern units of the picks 1 to 5 are shown in FIGS. 12A to 12F. Patterns of picks 6 and 7 are the patterns of FIGS. 3A and 3B described above.

FIG. 12A shows the pattern, the density, and the information amount of the bench mark. FIG. 12B shows the pattern of pick 1. In the pattern, 1 dot is printed in a 7×7 pixel block, the density is equal to of the bench mark, and the information amount can exceed of the bench mark.

FIG. 12C shows the pattern of pick 2. In the pattern, 1 dot is printed in a 7×7 pixel block, the density is equal to of the bench mark, and the information amount can exceed of the bench mark.

FIG. 12D shows the pattern of pick 3. In the pattern, 1 dot is printed in a 8×8 pixel block, the density is lower than of the bench mark, and the information amount can exceed of the bench mark.

FIG. 12E shows the pattern of pick 4. In the pattern, 2 dots are printed in a 10×10 pixel block, the density is lower than of the bench mark, and the information amount can exceed of the bench mark.

FIG. 12F shows the pattern of pick 5. In the pattern, 2 dots are printed in a 11×11 pixel block, the density is lower than of the bench mark, and the information amount can exceed of the bench mark.

Figure 14:
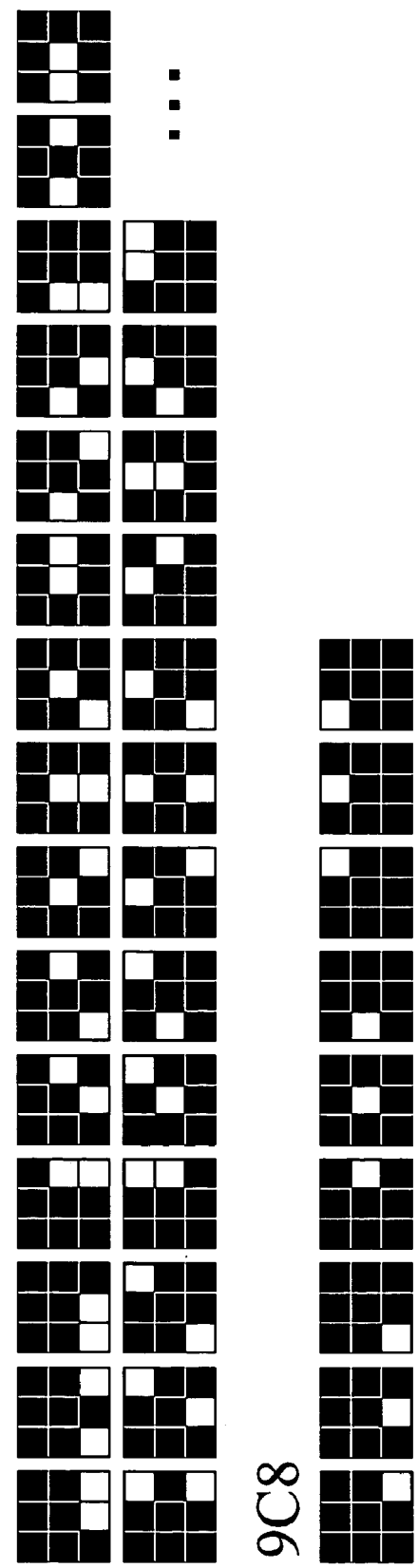
FIG. 14 is a view showing code pattern units according to an exemplary embodiment of the invention.

Further, the code pattern unit may be patterns of FIG. 13 to FIG. 17. FIG. 13 shows code pattern units of 9C1 method of selecting 1 from 9 dot printing areas, 9C4 method of selecting 4 from 9 dot printing areas, 9C5 method of selecting 5 from 9 dot printing areas, and 9C6 method of selecting 6 from 9 dot printing areas. FIG. 14 shows code pattern units of 9C7 method of selecting 7 from 9 dot printing areas and 9C8 method of selecting 8 from 9 dot printing areas.

Figure 15:
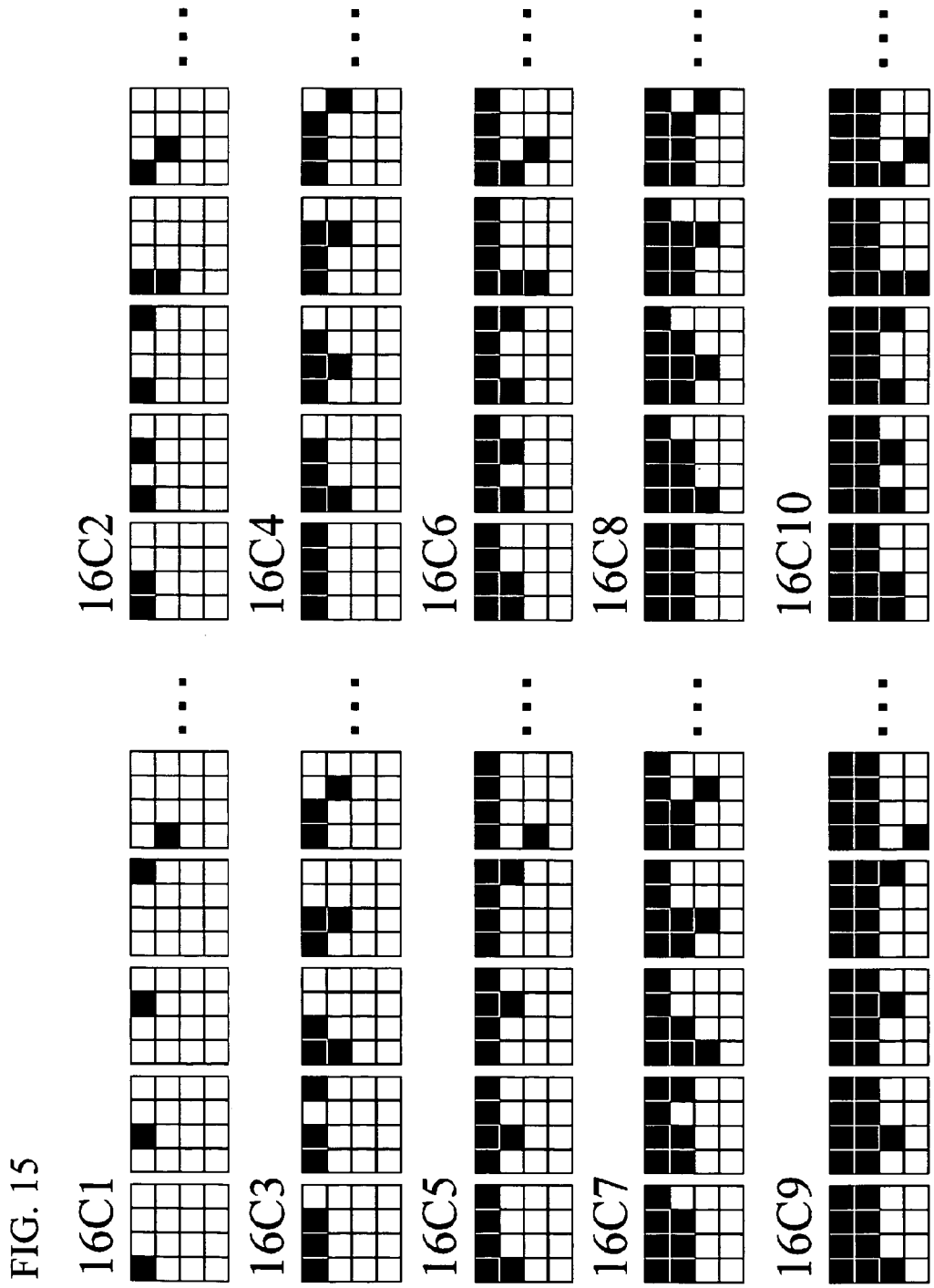
FIG. 15 is a view showing code pattern units according to an exemplary embodiment of the invention.
Figure 16:
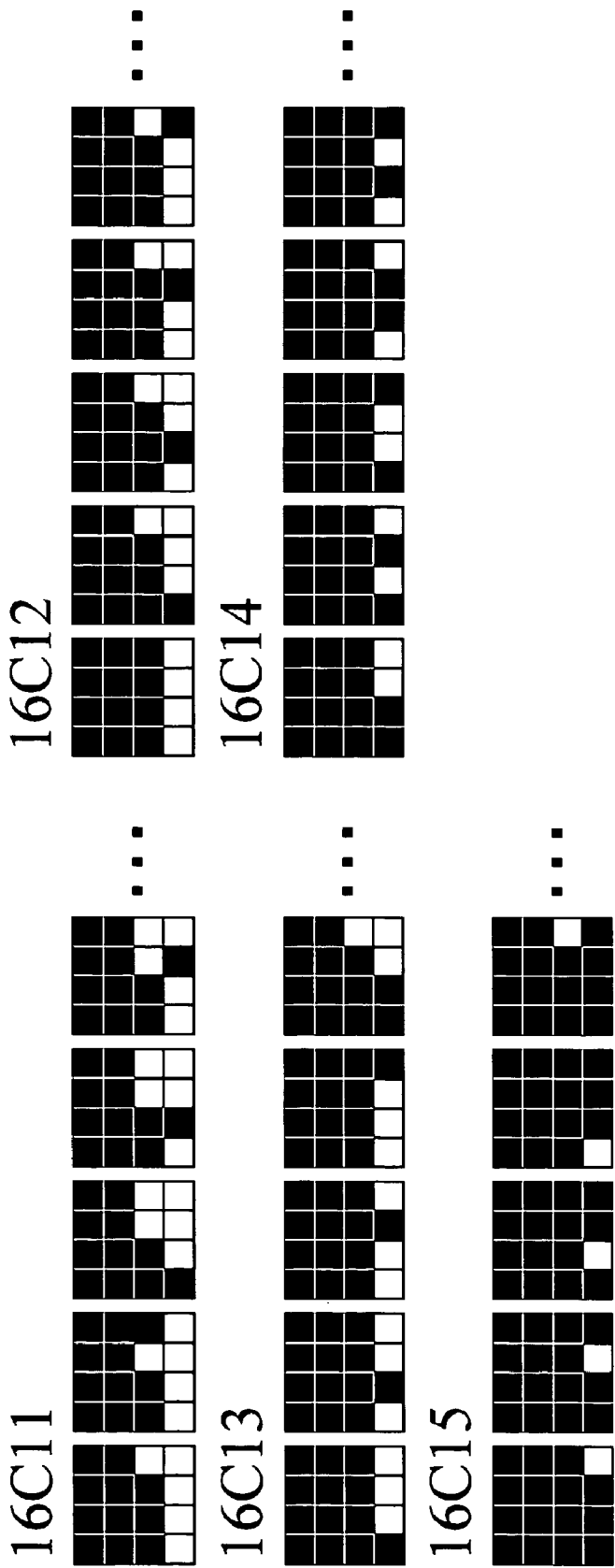
FIG. 16 is a view showing code pattern units according to an exemplary embodiment of the invention.

Further, FIGS. 15 and 16 show code pattern units of 16C1 method of selecting 1 from 16 dot printing areas, 16C2 method of selecting 2 from 16 dot printing areas, 16C3 method of selecting 3 from 16 dot printing areas, 16C4 method of selecting 4 from 16 dot printing areas, 16C5 method of selecting 5 from 16 dot printing areas, 16C6 method of selecting 6 from 16 dot printing areas, 16C7 method of selecting 7 from 16 dot printing areas, 16C8 method of selecting 8 from 16 dot printing areas, 16C9 method of selecting 9 from 16 dot printing areas, 16C10 method of selecting 10 from 16 dot printing areas, 16C11 method of selecting 11 from 16 dot printing areas, 16C12 method of selecting 12 from 16 dot printing areas, 16C13 method of selecting 13 from 16 dot printing areas, 16C14 method of selecting 14 from 16 dot printing areas, and 16C15 method of selecting 15 from 16 dot printing areas.

Figure 17:
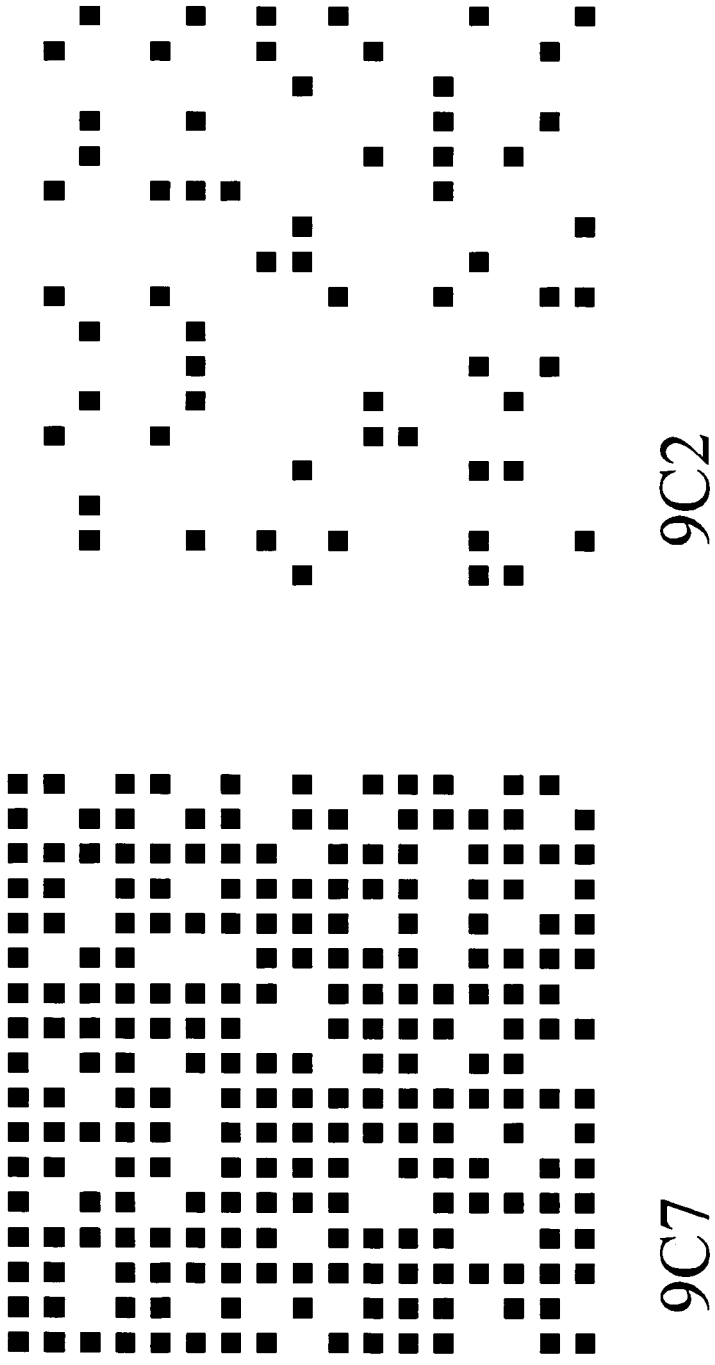
FIG. 17 is a view showing code pattern units of 9C2 method and 9C7 method.

There are patterns in relation to a positive and a negative such as 9C2 method and 9C7 method shown in FIG. 17. In the 9C7 method in which the number of selected dots is large, though the density is high, dots can be easily detected. Further, in this case, when noise is added, the added noise is likely to be overlapped with the dots. In result, the 9C7 method is not vulnerable to noise.

As other examples in relation to a positive and a negative, 9C3 and 9C6, and 9C4 and 9C5 can be cited.

Next, a method of detecting the code pattern unit formed as above and obtaining information will be described.

Figure 18:
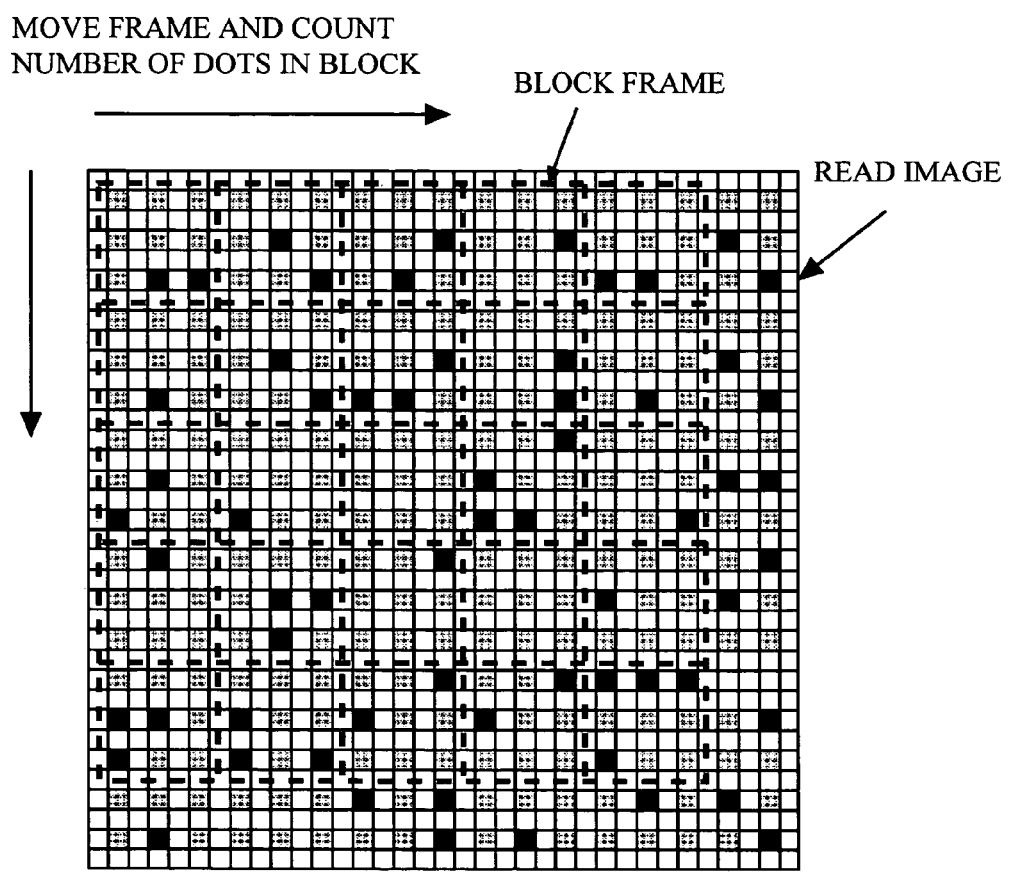
FIG. 18 is a view showing a state that a block frame is overlaid on dot patterns.

First, by an input device such as a pen device, a code pattern unit with a previously set sized area is read. Next, as shown in FIG. 18, by laying a block frame on a read image, block break points are detected. The bock frame is a minimum unit necessary in decoding buried information. In this embodiment, a 5×5 block frame is used.

Figure 19:
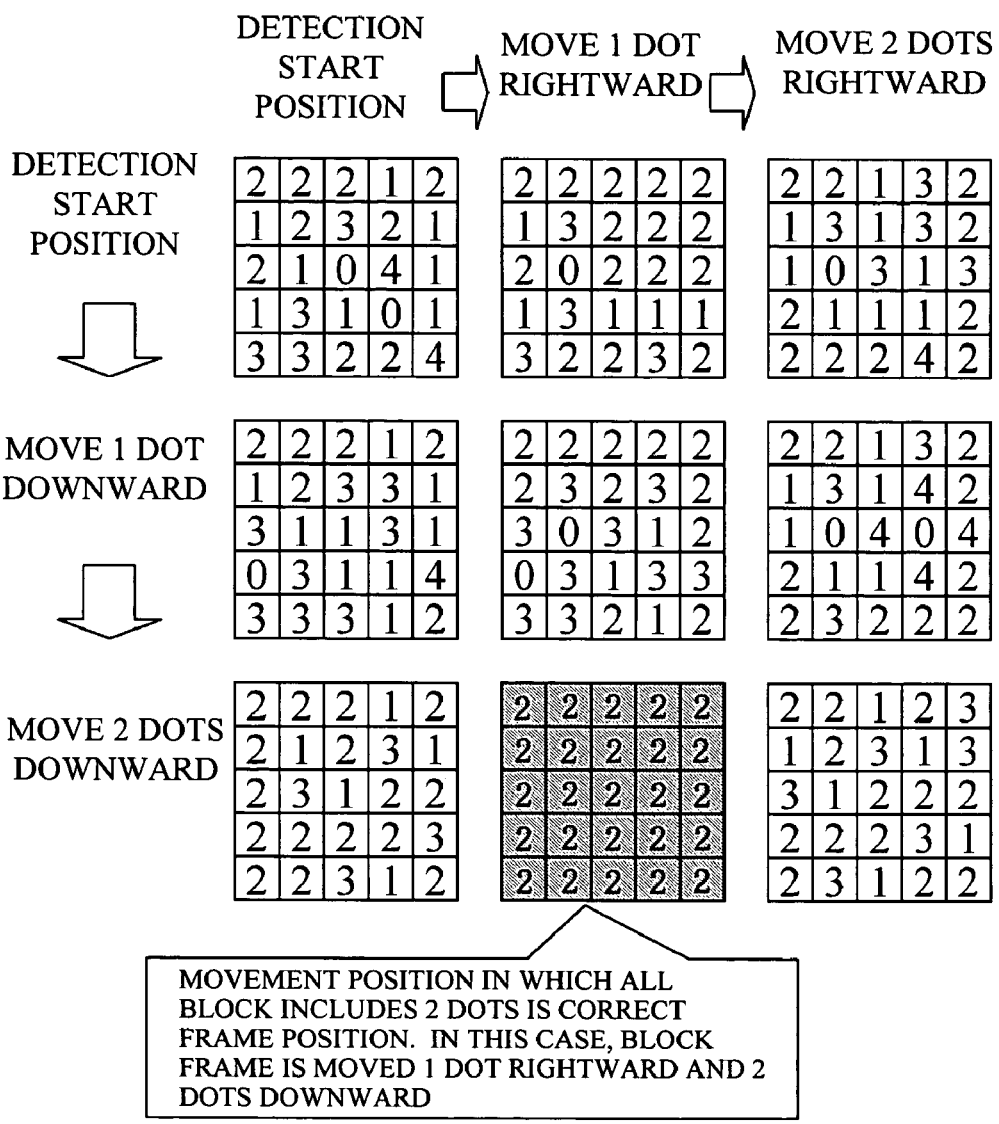
FIG. 19 is a view showing a procedure of moving the block frame and detecting block break points.

As shown in FIG. 18, by moving the block frame, the position in which the number of dots printed in each block becomes 2 is searched. As shown in FIG. 19, by moving the block frame from the detection start position rightward and downward every line, the position in which the number of dots in each block becomes 2 is detected. Details of the processing will be described later.

Next, synchronous codes will be described. In this embodiment, the code pattern units include the synchronous codes. By detecting the synchronous code, the direction of the code pattern unit and the reference point in decoding information in the block are judged.

Figure 20:
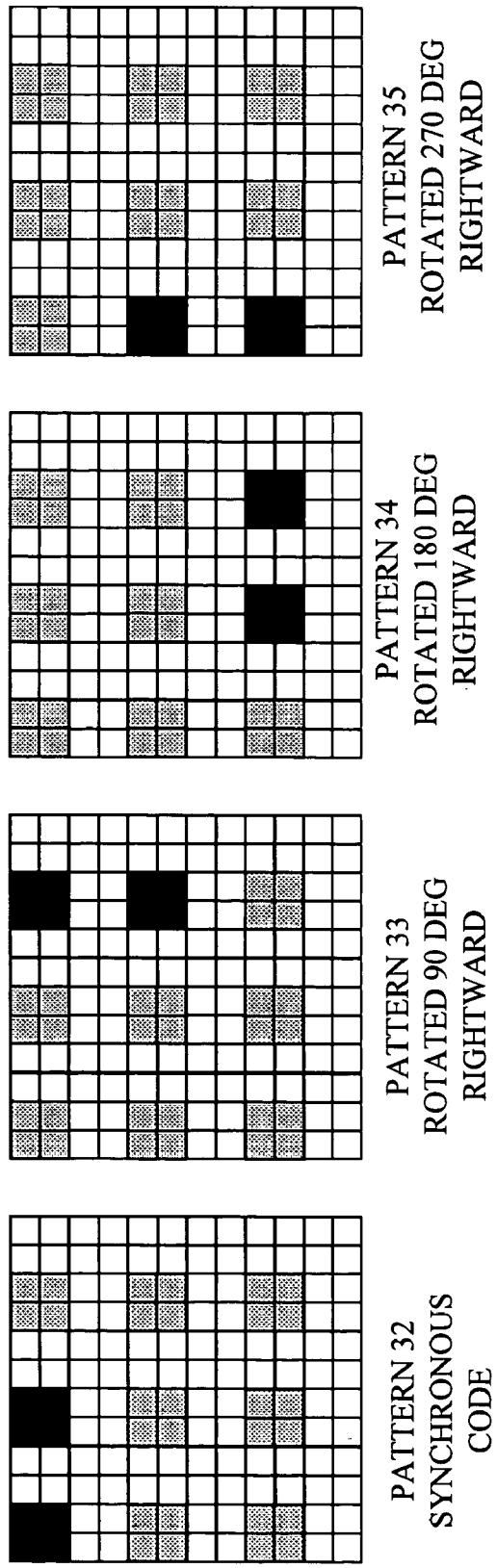
FIG. 20 is a view showing synchronous code pattern units.

For the synchronous codes, of the code pattern units shown in FIG. 4, the patterns with the pattern values 32 to 35 are used. As shown in FIG. 20, when one of the code pattern units with the pattern values 32 to 35 is selected, other 3 code pattern units correspond with patterns which are rotated 90 degrees, 180 degrees, and 270 degrees from the selected code pattern unit respectively.

As the synchronous codes, in addition to the foregoing patterns, groups of patterns with pattern values 4 to 7, 8 to 11, 12 to 15, 16 to 19, 20 to 23, 24 to 27, and 28 to 31 are available. These patterns are groups of patterns which correspond with each other when each thereof is rotated.

For example, as shown in FIG. 21, one of the synchronous codes of the patterns 32 to 35 is inserted in a specified position of the foregoing 5×5 block frame. Here, the pattern No. 32 is inserted in the upper left of the 5×5 block. Then, an image is read and the patterns with the pattern values 32 to 35 are searched. Here, for example, when the pattern No. 35 is detected as shown in FIG. 21, the image is rotated 90 degrees rightward in order to convert the pattern No. 35 to the pattern No. 32. The pattern with the pattern value 35 is an image obtained by rotating the pattern No. 32 rightward 270 degrees as shown in FIG. 20. Thereby, information can be decoded in the correct direction.

Figure 22A:
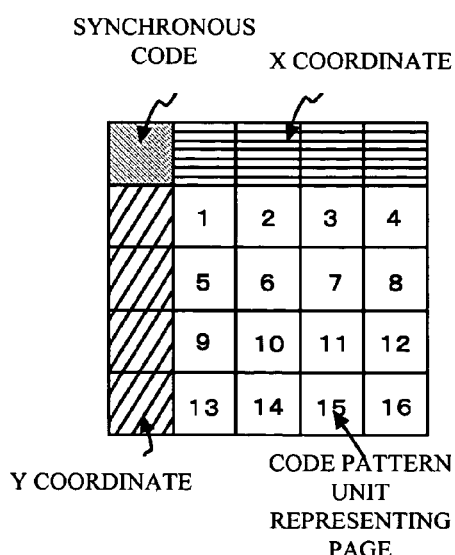
FIGS. 22A, 22B, and 22C are views showing arrangement of code pattern units in the block frame.
Figure 22B:
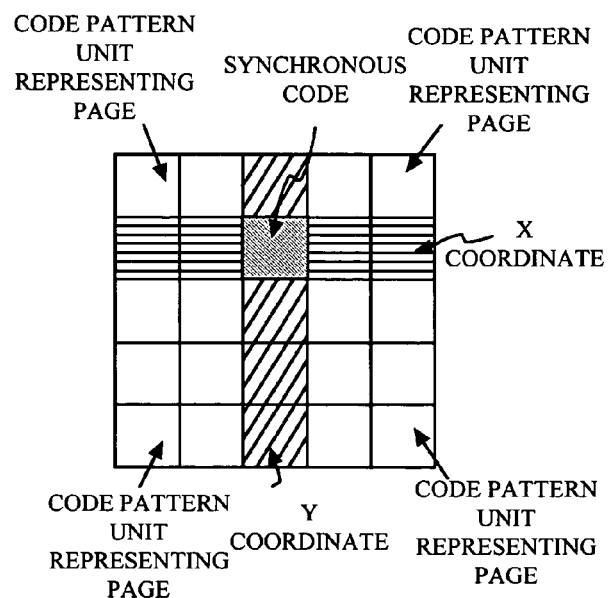
Figure 22C:
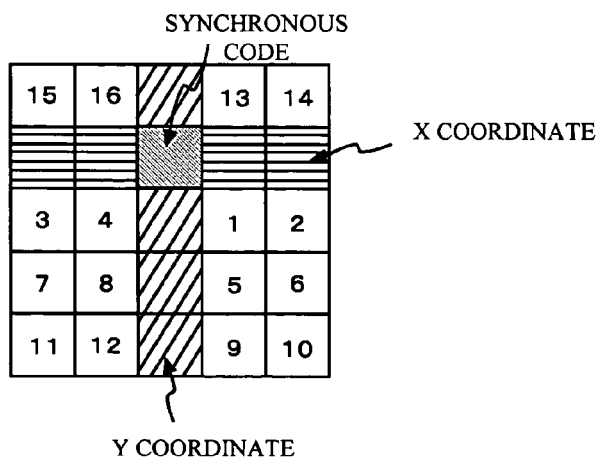

With reference to FIGS. 22A, 22B, and 22C, an example of a layout of code pattern units in a block frame will be hereinafter described. In the block frame, a code pattern unit of a synchronous code, code pattern units representing page numbers, and code pattern units representing coordinate values on the page are buried. In FIG. 22A, an example of a layout which becomes a basic of these code pattern units is shown.

Code pattern units representing the X coordinate on the page composes a line including the synchronous code, and are recorded in a block parallel to the X coordinate direction. In similar fashion, code pattern units showing the Y coordinate composes a line including the synchronous code, and are recorded in a block parallel to the Y coordinate direction.

The basic structure is arranged on the whole page. Then, for the X coordinate and the Y coordinate, a sequence called M sequence extending across the full width of the page is used. The M sequence is a sequence having a certain length cycle. A partial sequence thereof does not correspond with other partial sequence. By utilizing such characteristics, a position of a partial sequence in the whole sequence can be identified. Where the length of a partial sequence is n, the length of the whole sequence becomes $2^n-1$.

Then, the whole sequence represents the whole page. The partial sequence represents a sequence expressed by the number of blocks of the basic structure.

Figure 23:
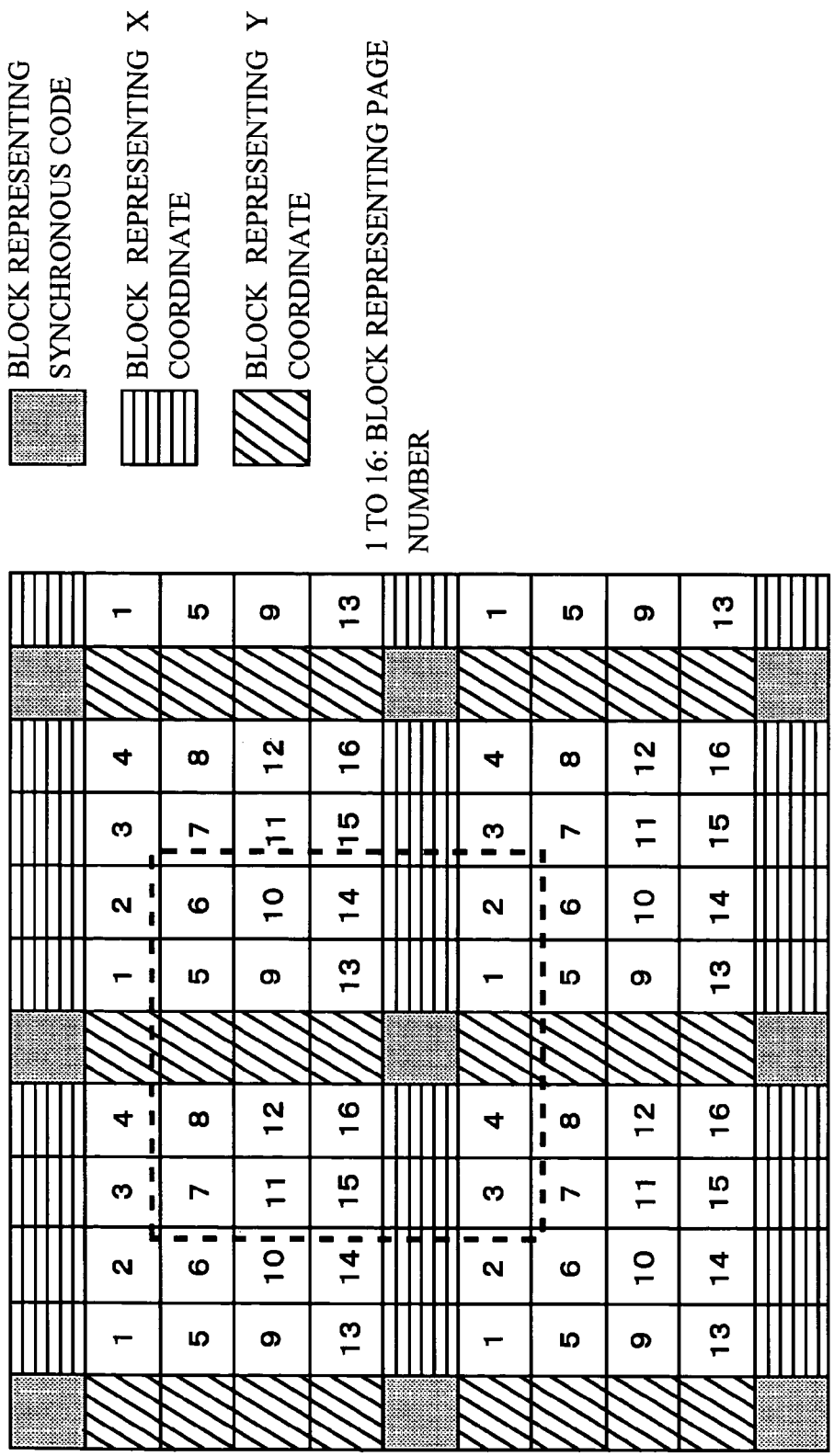
FIG. 23 is a view showing code pattern units arranged on a whole sheet.

Further, the code pattern units representing page numbers are displayed by using all blocks except for the blocks for the code pattern units of the synchronous codes and the code pattern units representing the coordinate values on the page. For the code pattern units representing page numbers, the basic structure pattern is copied throughout the whole page. That is, blocks written with numbers shown in FIG. 23 are blocks representing page numbers. These block Nos. 1 to 16 are repeatedly copied throughout the whole page. Therefore, if a reading position is misaligned as a block frame denoted by a dotted line of FIG. 23, the codes representing page numbers are repeatedly copied and therefore interpolation can be made to decode the page numbers.

The codes of the whole page are structured as above. However, in reading, the basic structure pattern is not necessarily read. FIG. 22B shows a reading example in such a case. In this case, the synchronous code exists in the block which is the third from the left and the second from the top. Wherever the X coordinate and the Y coordinate are read, the coordinates of the partial sequence of the whole sequence can be decoded. In reading page numbers, as shown in FIG. 22C, the block located lower right of the synchronous code is assigned to the first block, and the block on the right side of the first block is assigned to the second block. Further, if there is no block on the right side of the first block, the block located at the far left is used. Next, from the block on the right side of the first block, reading is performed sequentially rightward. After the sequential reading reaches the Y coordinate pattern, the block under the first block is read, and sequential reading is repeated as above. Then, when reading the final line in the Y axis direction is finished, as shown in FIG. 22C, reading position is back to the top line, and reading is performed from the top block above the first block. By performing decoding in this order, the page numbers can be obtained.

In reading the X coordinate, blocks in the line including the synchronous code are read by skipping the synchronous code. In reading the Y coordinate, blocks in the column including the synchronous code are read by skipping the synchronous code. By reading the blocks in this order, the coordinates can be decoded.

[Structure of Image Generating Apparatus]

Figure 24:
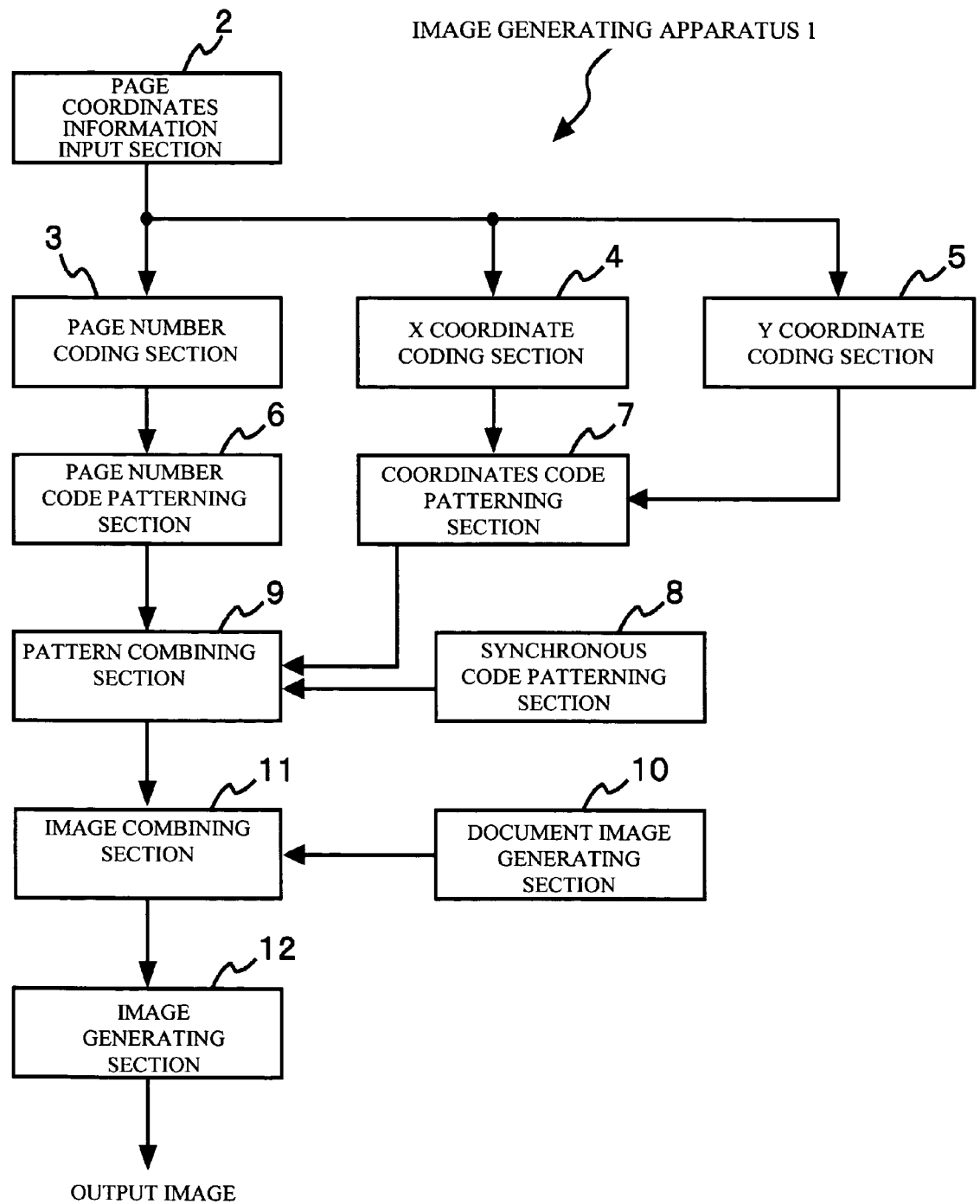
FIG. 24 is a view showing a structure of an image generating apparatus.

Next, with reference to FIG. 24, a structure of an image generating apparatus 1 for generating the foregoing coded pattern unit will be described. As shown in FIG. 24, the image generating apparatus 1 includes a page/coordinates information input section 2, a page number coding section 3, an X coordinate coding section 4, a Y coordinate coding section 5, a page number code patterning section 6, a coordinates code patterning section 7, a synchronous code patterning section 8, a pattern combining section 9, a document image generating section 10, an image combining section 11, and an image generating section 12.

The page/coordinates information input section 2 outputs each page number to the page number coding section 3. Further, the page/coordinates information input section 2 outputs X axis coordinate information on each page to the X coordinate coding section 4, and outputs Y axis coordinate information on each page to the Y coordinate coding section 5.

The page number coding section 3 codes page information inputted from the page/coordinates information input section 2. The coded page information is outputted to the page number code patterning section 6.

The X coordinate coding section 4 codes the X coordinate information. The Y coordinate coding section 5 codes the Y coordinate information. Coded information of the X coordinate and the Y coordinate is outputted to the coordinates code patterning section 7.

The page number code patterning section 6 generates a code pattern unit of the coded page number, and outputs the code pattern unit to the pattern combining section 9. The coordinates code patterning section 7 generates code pattern units of the coded X coordinate and the coded Y coordinate, and outputs the code pattern units to the pattern combining section 9.

Further, a code patterned synchronous code is outputted from the synchronous code patterning section 8 to the pattern combining section 9. The pattern combining section 9 combines the code pattern units of the page numbers, the X coordinate, the Y coordinate, and the synchronous code, and generates image data for 1 page to be arranged in a given position on the page.

The image combining section 11 generates an image in which a document image outputted from the document image generating section 10 is overlaid on the code pattern units of page numbers, the X coordinate, the Y coordinate, and the synchronous code outputted from the pattern combining section 9. By outputting the image data to the image generating section 12, an image in which the document image is formed on the code pattern units is printed on the sheet.

[Image Processing Apparatus]

Next, with reference to FIG. 25, a structure of an image processing apparatus 20 for reading an image with code pattern units and processing the image will be described.

Figure 25:
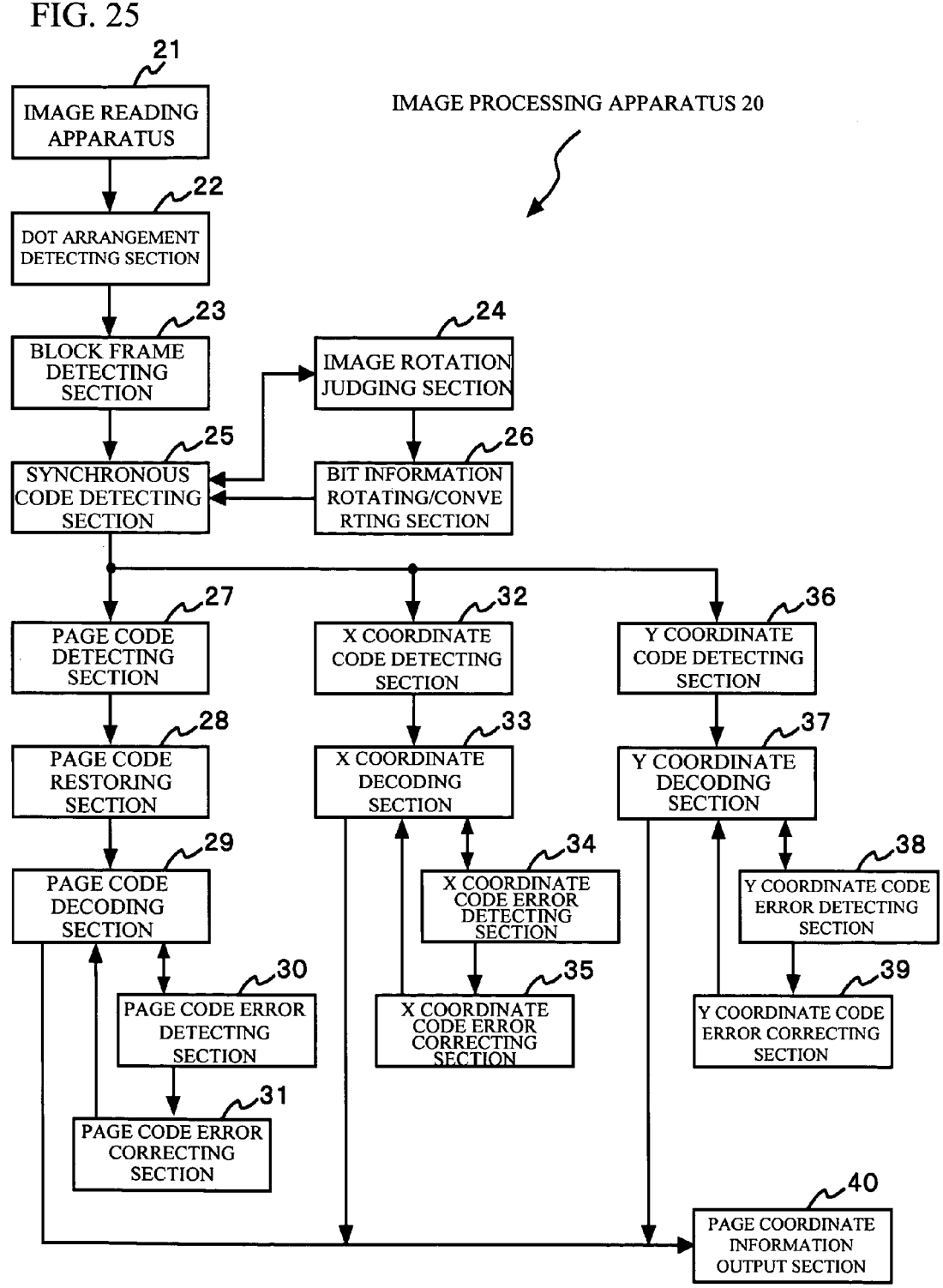
FIG. 25 is a view showing a structure of an image processing apparatus.

As shown in FIG. 25, the image processing apparatus 20 includes an image reading apparatus 21, a dot arrangement detecting section 22, a block frame detecting section 23, an image rotation judging section 24, a synchronous code detecting section 25, a bit information rotating/converting section 26, a page code detecting section 27, a page code reconstructing section 28, a page code decoding section 29, a page code error detecting section 30, a page code error correcting section 31, an X coordinate code detecting section 32, an X coordinate decoding section 33, an X coordinate code error detecting section 34, an X coordinate code error correcting section 35, a Y coordinate code detecting section 36, a Y coordinate decoding section 37, a Y coordinate code error detecting section 38, a Y coordinate code error correcting section 39, and a page coordinate information output section 40.

The image reading apparatus 21 is composed of an input device such as a pen device. The image reading apparatus 21 outputs read image data to the dot arrangement detecting section 22. The dot arrangement detecting section 22 detects dots from the read image data, and records coordinate values of the dots in a memory. A dot arrangement which is dot arrangement information is recorded in the memory.

The block frame detecting section 23 lays a block frame on the dot arrangement developed in the memory, and adjusts a position of the block frame so that the number of dots in each block becomes 2.

The synchronous code detecting section 25 detects a synchronous code. The image rotation judging section 24 judges rotation of the image. The bit information rotating/converting section 26 rotates a code pattern unit by the rotation angle detected by the image rotation judging section 24, and sets the code pattern unit in the correct direction.

The page code detecting section 27 detects page code pattern units from code pattern units in the block frame. The page code reconstructing section 28 sorts the obtained page code pattern units in the order of page numbers. The page code decoding section 29 decodes the page code pattern units. The page code error detecting section 30 detects an error of the decoded page codes. When the detected error of the page code is a correctable error, the page code error correcting section 31 corrects the error. The corrected page code is outputted to the page code decoding section 28.

The X coordinate code detecting section 32 detects code pattern units representing the X coordinate. The X coordinate decoding section 33 decodes the code pattern units of the X coordinate. The X coordinate code error detecting section 34 detects an error of the decoded X coordinate codes. The X coordinate code error correcting section 35 corrects an error of the X coordinate codes.

The Y coordinate code detecting section 36 detects code pattern units representing the Y coordinate. The Y coordinate decoding section 37 decodes the code pattern units of the Y coordinate. The Y coordinate code error detecting section 38 detects an error of the decoded coordinate codes. The Y coordinate code error correcting section 39 corrects an error of the Y coordinate codes.

Next, with reference to the flowchart shown in FIG. 26, a processing procedure of the dot arrangement detecting section 22 and the block frame detecting section 23 will be described.

First, an image in the area where a page and coordinates should be identified is read by the image reading apparatus 21 (step S1). Next, the dot arrangement detecting section 22 detects dots from the image, and stores coordinates information of positions where the dots are detected in a dot arrangement storing section of the memory (step S2). For the size of the dot arrangement, a size which includes the number of blocks necessary for decoding and the number of dots obtained by subtracting 1 from the number of dots of one side of a block is necessary. Therefore, in this embodiment, since the number of blocks necessary for decoding is 15×15 and one side of a block includes 3 dots, a dot arrangement of 17×17 should be stored.

Next, a block frame is laid on the dot arrangement showing the positions of the detected dots (step S3). As shown in FIG. 18, the block frame becoming a decoding unit is laid on the data showing the dot positions. In this embodiment, a 5×5 block frame is used. Then, the initial value 0 is set for counters I and J, and 0 is set for MaxBN (step S4). The counters I and J count the number of steps by which the block frame is moved from the initial position. As the block frame is moved for every line of the image, the number of lines by which the block frame is moved is counted by the counters I and J. The position of laying the block frame on the data may be a given position. Even if the reading position is misaligned, the codes representing page numbers are repeatedly copied and therefore interpolation can be made to decode the page numbers. Further, blocks representing coordinate values in the X axis direction and the Y axis directions are always included in one block frame.

MaxBN records the maximum count value obtained when the number of blocks in which the number of dots detected in the block becomes 2 is counted while the block frame is moved.

Next, the block frame is moved by I in the X axis direction, and moved by J in the Y axis direction (step S5). Since I and J are set to 0 as the initial value, the block frame is not moved. Then, the number of dots included each block of the block frame is counted, and the number of blocks in which the number of dots becomes 2 is counted. The counted number of blocks is stored in a register of IB[I][J] (step S6). In the [I] and [J] of IB[I][J], values of I and J representing movement amounts of the block frame are respectively recorded.

Next, IB[I][J] is compared to MaxBN (step S7). Since MaxBN is set to 0 as the initial value, IB[I][J] is larger than MaxBN in the first comparison (step S7/YES). When IB[I][J] is larger than MaxBN (step S7/YES), the value of IB[I][J] is registered as MaxBN. The value of I is regarded as MX, and the value of J is regarded as MY (step S8).

Next, judgment is made whether or not I is 2 (step S9) When judged that I is not 2 (step S9/NO), the value of I is increased by 1 (step S10). Then, processing of steps S5 and S6 is repeated, and IB[I][J] is compared with MaxBN (step S7).

When IB[I][J] is larger than MaxBN which is the previous IB[I][J] (step S7/YES), IB[I][J] is registered as MaxBN. The value of I then is regarded as MX, and the value of J then is regarded as MY (step S8). When MaxBN is larger than IB[I][J] (step S7/NO), judgment is made whether or not the value of I is 2 (step S9). When judged that I is 2 (step S9/YES), next, judgment is made whether or not the value of J is 2 (step S11). When judgment is made that J is not 2 (step S11/NO), the value of I is reset to 0, and the value of J is increased by 1 (step S12). Such steps are repeated, and the maximum IB[I][J] is detected among from (I=0, J=0) to (I=2, J=2).

Processing up to judging I=2 and J=2 is finished (step S11/YES), the stored MaxBN is compared to a judgment threshold value TB (step S13). The judgment threshold value TB is a threshold value used for judging whether or not the number of blocks in which the number of dots is 2 is larger than the previously set threshold value. When the MaxBN value is smaller than the judgment threshold value TB, judgment is made that noise of the image is large and thus decoding is not possible, and decoding impossible is outputted (step S15). When MaxBN exceeds the judgment threshold value (step S13/YES), the block frame is fixed in the position of MX and MY, at which position code pattern units of each block are detected, which are converted to corresponding pattern values. The pattern values are recorded in the memory as P[X][Y] together with variables X and Y for identifying each block. When the detected code pattern unit is not able to be converted to the corresponding pattern value, [−1] is recorded instead of the pattern value (step S14).

Figure 27:
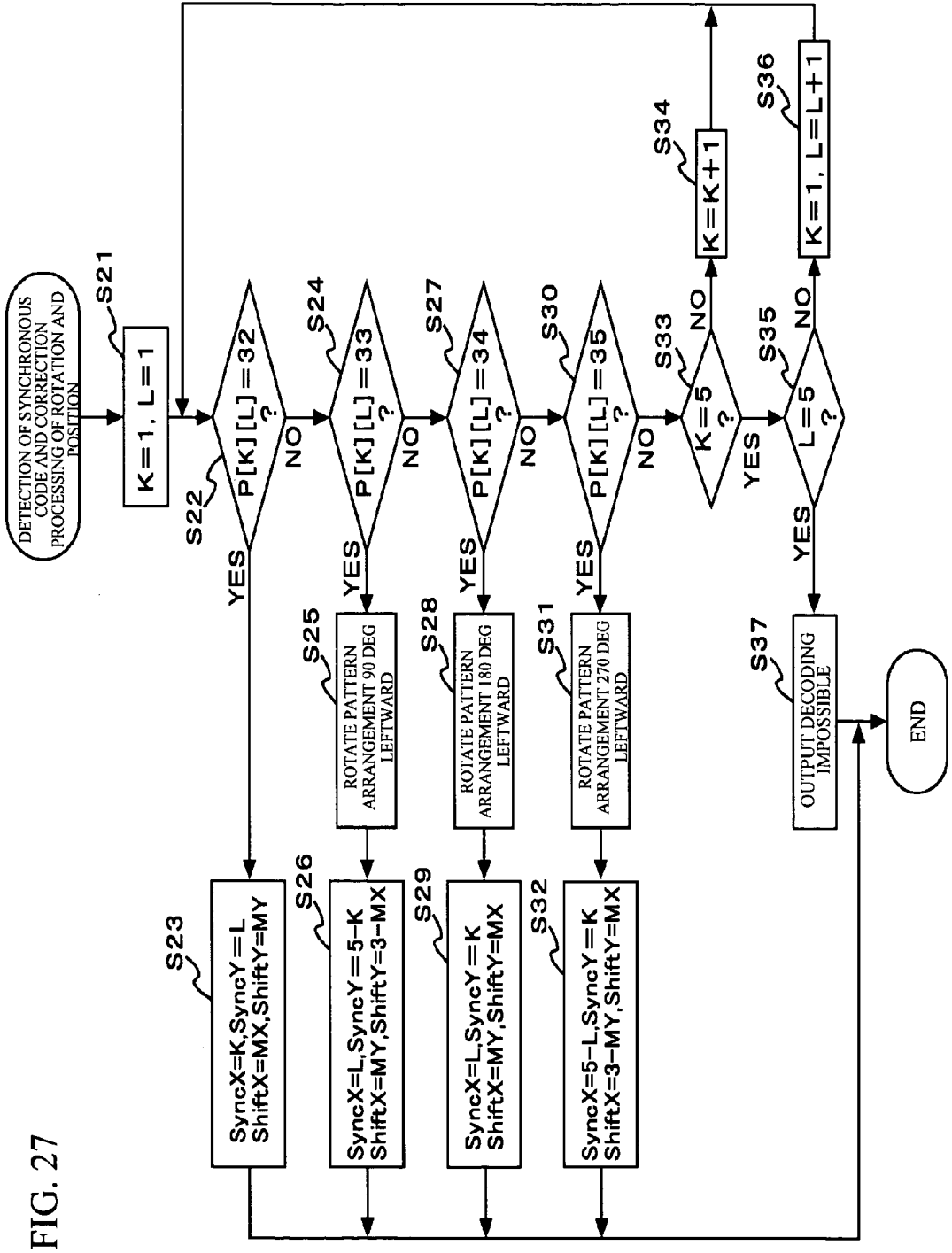
FIG. 27 is a flowchart showing a procedure of detecting a synchronous code and rotating a code pattern unit.

Next, with reference to the flowchart shown in FIG. 27, detection of a synchronous code and correction for rotating an image in a correct direction will be described. Such processing is performed by the image rotation judging section 24 and the bit information rotating/converting section 26.

First, values of K and L are set to 1 (step S21). K is a variable representing a block number in the X axis direction. L is a variable representing a block number in the Y axis direction.

Next, judgment is made whether or not a pattern value of P[K][L] is 32 (step S22). In this embodiment, as a synchronous code, the code pattern unit with the pattern value 32 is used, and therefore a block thereof is searched.

When the block in which the pattern value of P[K][L] is 32 is detected (step S22/YES), judgment is made that it is not necessary to rotate the code pattern unit, and the X coordinate and the Y coordinate of the block in which the synchronous code is located are regarded as K and L. Further, the number of lines representing a movement amount of the block frame (ShiftX, ShiftY) is regarded as (MX, MY) (step S23).

Next, when a block in which the pattern value of P[K][L] is 33 is detected (step S24/YES), the code pattern unit is rotated 90 degrees leftward (step S25). As shown in FIG. 20, the code pattern unit with the pattern value 33 is an image obtained by rotating the code pattern unit with the pattern value 32 rightward 90 degrees. Therefore, the code pattern unit with the pattern value 33 is rotated 90 degrees in the opposite direction (step S25).

Further, according to the rotation, the X coordinate and the Y coordinate of the block in which the synchronous code is located are regarded as L and 5-K. Further, the number of lines representing a movement amount of the block frame (ShiftX, ShiftY) is regarded as (MY, 3-MX) (step S26).

Next, when a block in which the pattern value of P[K][L] is 34 is detected (step S27/YES), the code pattern unit is rotated 180 degrees leftward (step S28). As shown in FIG. 20, the code pattern unit with the pattern value 34 is an image obtained by rotating the code pattern unit with the pattern value 32, 180 degrees. Therefore, the code pattern unit with the pattern value 34 is rotated 180 degrees (step S28).

Further, according to the rotation, the X coordinate and the Y coordinate of the block in which is the synchronous code is located are regarded as L and K. Further, the number of lines representing a movement amount of the block frame (ShiftX, ShiftY) is regarded as (MY, MX) (step S29).

Next, when a block in which the pattern value of P[K][L] is 35 is detected (step S30/YES), the code pattern unit is rotated 270 degrees leftward (step S31). As shown in FIG. 20, the code pattern unit with the pattern value 35 is an image obtained by rotating the code pattern unit with the pattern value 32 rightward 270 degrees. Therefore, the code pattern unit with the pattern value 35 is rotated 270 degrees leftward (step S31).

Further, according to the rotation, the X coordinate and the Y coordinate of the block in which the synchronous code is located are regarded as 5−L and L. Further, the number of lines representing a movement amount of the block frame (ShiftX, ShiftY) is regarded as (3−MY, MX) (step S32).

The foregoing processing is repeated until the block with the pattern value 32, 33, 34, or 35 is detected while the values of K and L are changed (steps S34 and S36). Further, if K=5 and L=5 are obtained (steps S33/YES and S35/YES), in the case that the block with the pattern value 32, 33, 34, or 35 is not able to be detected, a judgment signal of decoding impossible is outputted (step S37).

Figure 28:
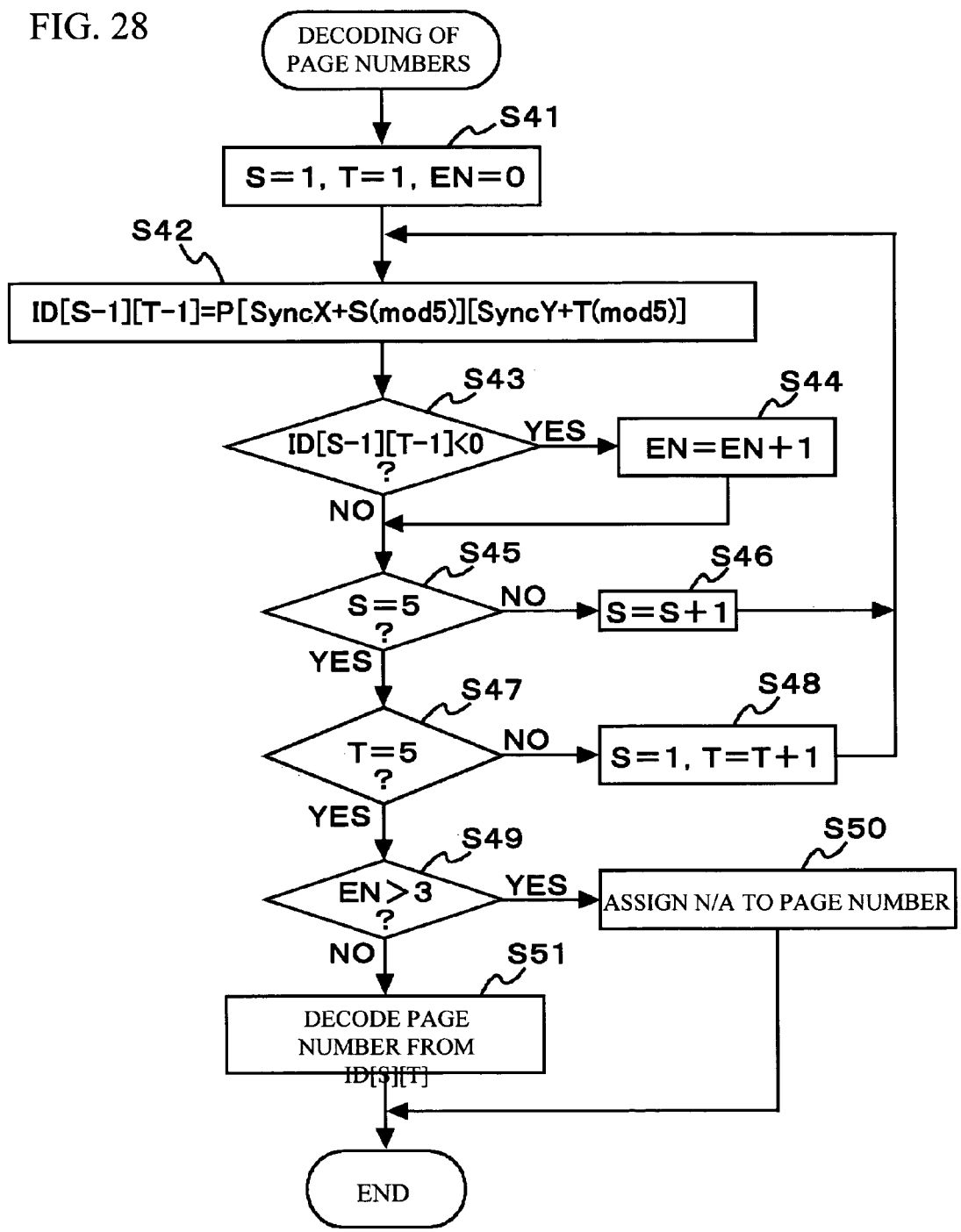
FIG. 28 is a flowchart showing a procedure of decoding page numbers.

Next with reference to the flowchart shown in FIG. 28, a processing procedure in which code pattern units representing page numbers are detected, the code pattern units are sorted in numerical order, and the code pattern units are decoded will be described. The processing is performed by the code detecting section 27, the page code restoring section 28, and the page number decoding section 29.

First, variables S and T for identifying each block of a 5×5 block frame are set to 1. A counter EN for counting the number of blocks judged as an error among the blocks representing page numbers is set to 0 (step S41). Here, S is a variable counting the block number in the X axis direction. T is a variable counting the block number in the Y axis direction.

Next, a corresponding code pattern unit is obtained from the code pattern unit storing section in the memory. Here, a code pattern unit with a number meeting P[(SyncX+S)(mod5)][(SyncY+T) (mod5)] is obtained, which is set as ID[S−1] [T−1] (step S42). Here, a synchronous code SyncX is a variable which can be 0, 1, 2, 3, or 4. The block at the far left in the X axis direction is regarded as the 0th block, and the block at the far right in the X axis direction is regarded as the forth block.

For example, as shown in FIG. 22C, the case that a synchronous code is located in the third block from the left in the X axis direction and located in the second block from the top in the Y axis direction within the block frame will be described, for example. Code pattern units representing page numbers start from the block located lower right from the synchronous code. Therefore, the block which is the fourth block from the left in the X axis direction and is the third block from the top in the Y axis direction becomes the first block representing a page number.

Therefore, when the block where the synchronous code is located (SyncX) is added with S and the result is divided by 5, the remainder thereof becomes a value representing the block in the X axis direction. Similarly, when the block where the synchronous code is located (SyncY) is added with T and the result is divided by 5, the remainder thereof becomes a value representing the block in the Y axis direction.

When the pattern value of P[(SyncX+S)(mod5)][(SyncY+T)(mod5)] is obtained (step S42), the pattern value is regarded as the ID[S−1][T−1]th pattern value, and judgment is made whether or not the pattern value exceeds 0 (step S43).

Figure 26:
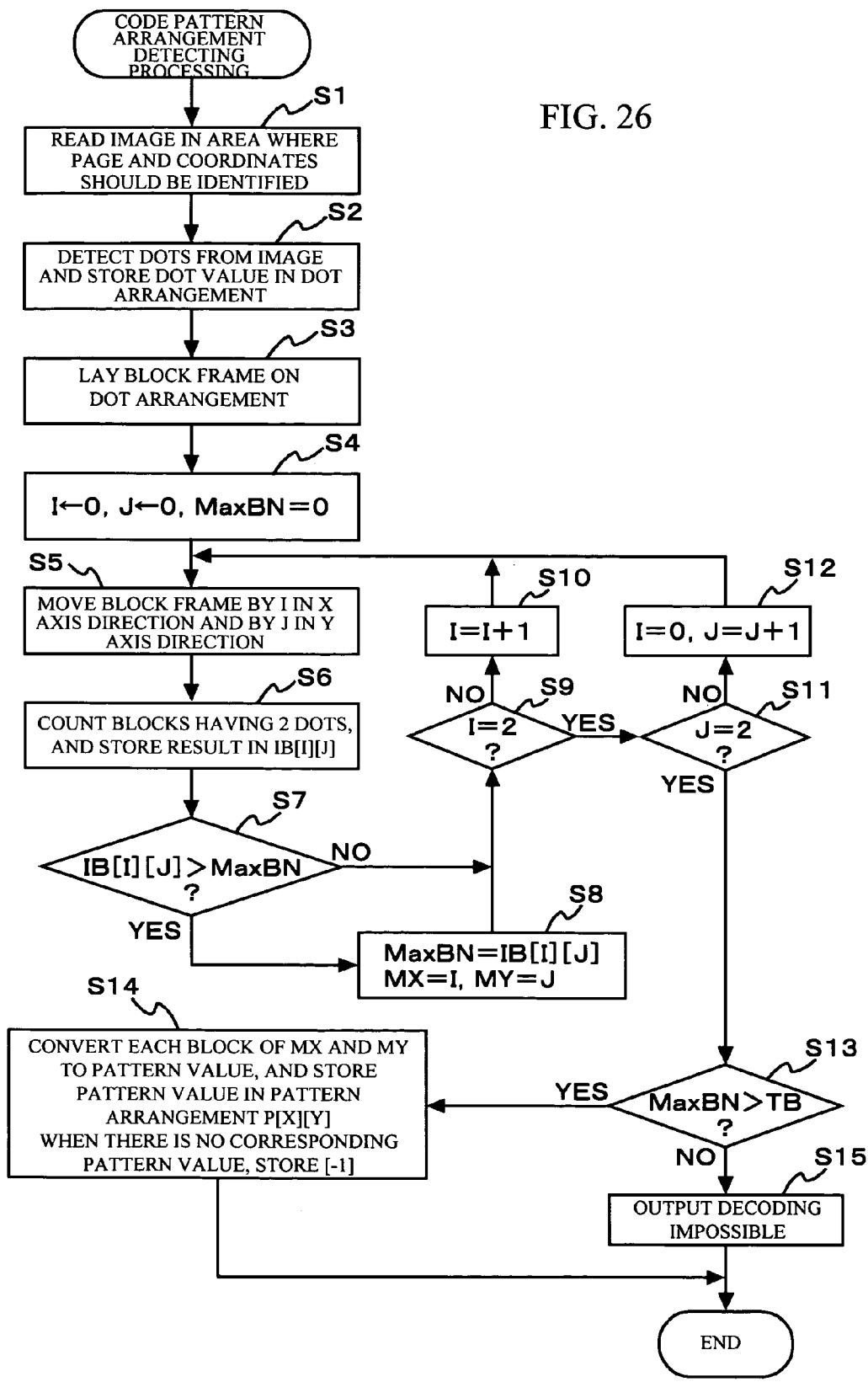
FIG. 26 is a flowchart showing a procedure for detecting an arrangement of code pattern units.

In the step S14 in the flowchart shown in FIG. 26, when the detected code pattern unit is not able to be converted to the corresponding pattern value, [−1] is recorded. Therefore, by comparing the pattern value of ID[S−1][T−1]read from the memory to 0, judgment is made whether or not the code pattern unit is normally pattern-judged (step S43). When the pattern value is smaller than 0 (Step S43/YES), the counter EN counting the number of blocks judged as an error is incremented by 1 (step S44). Next, judgment is made whether or not the value of S is 5 (step S45). When the value of S is not 5 (step S45/NO), the value of S is incremented by 1 (step S46), and processing of steps S42 and S43 is repeated until the value of S becomes 5. Further, when the value of S becomes 5 (step S45/YES), next, judgment is made whether or not the value of T is 5 (step S47). When the value of T is not 5 (step S47/NO), the value of S is set to 1, the value of T is incremented by 1 (step S48), and processing of steps S42, S43, S45, and S46 is repeated until the value of T becomes 5. Further, when the value of T becomes 5 (step S47/YES), judgment is made whether or not the value of the counter EN counting the number of errors is larger than 3 (step S49).

In this embodiment, the number of errors allowable in decoding pages is set to 3. However, the number of errors allowable is not limited thereto. The number of errors allowable can be voluntarily set according to the coding method. When the number of errors is larger than 3 (step S49/YES), judgment is made that error occurrence frequency is high, and normal coding is not able to be performed, and N/A (not applicable) is outputted to the page number (step S50). When the number of the counter EN is smaller than 3 (step S49/NO), the page numbers are decoded in the order of arrangement ID[S][T] (S, T=0 to 4) (step S51).

Figure 29:
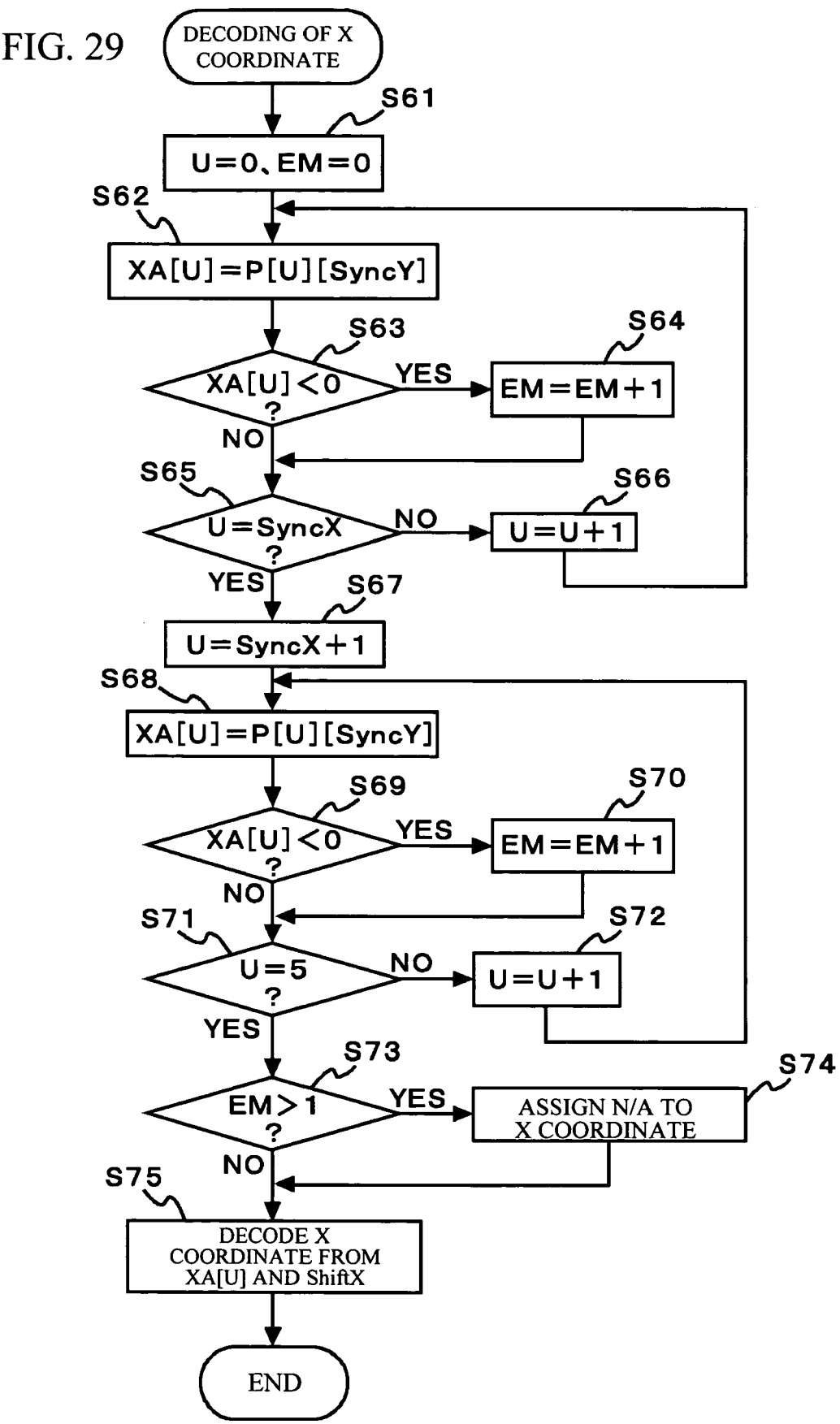
FIG. 29 is a flowchart showing a procedure of decoding the X coordinate.

Next, with reference to the flowchart shown in FIG. 29, a processing procedure of detecting and decoding an X coordinate code will be described. The processing is performed by the X coordinate code detecting section 32 and the X coordinate decoding section 33.

First, a variable U for counting a block number in the X axis direction of a block frame is set to 0. A counter EM which counts the number of blocks judged as an error among the blocks representing page numbers is set to 0 (step S61).

Next, a corresponding code pattern unit is obtained from the code pattern unit storing section in the memory. Here, a code pattern unit of a number meeting P[U][SyncY] is obtained, which is set as XA[U] (step S62). Here, a synchronous code SyncY is also a variable which can be 0, 1, 2, 3, or 4. The block at the uppermost in the Y axis direction is regarded as the 0th block, and the block at the lowermost in the Y direction is regarded as the forth block.

As shown in FIGS. 22A, 22B, and 22C, a block representing the X coordinate is a block having the same value as of the synchronous code block in the Y coordinate direction. Therefore, a pattern value of P[U][SyncY] is obtained from the memory, which is set to XA[U].

When the pattern value of P[U][SyncY] is obtained (step S62), the pattern value is regarded as the XA[U] pattern value, and judgment is made whether or not the pattern value exceeds 0 (step S63).

Here, by comparing the pattern value of XA[U]read from the memory to 0, judgment is made whether or not the code pattern unit is normally pattern-judged (step S63). When the pattern value is smaller than 0 (Step S63/YES), the counter EM counting the number of blocks judged as an error is incremented by 1 (step S64). Next, judgment is made whether or not the value of U becomes equal to SyncX (step S65). This processing is performed in order to omit the pattern of the block representing the synchronous code from patterns representing the X coordinate value. When the value of U is not equal to SyncX (step S65/NO), the value of U is increased by 1 (step S66), and processing of steps S63 and S65 is repeated. When the value of U becomes equal to SyncX (step S65/YES), SyncX+1 is set to U in order to skip the block of the synchronous code (step S67).

Next, a pattern value of P[SyncX+1] [SyncY] is obtained from the memory, and is set to XA[U] (step S68). After that, in the similar fashion to the foregoing procedure, by comparing the pattern value of XA[U]read from the memory to 0, judgment is made whether or not the code pattern unit is normally pattern-judged (step S69). When the pattern value is smaller than 0 (Step S69/YES), the counter EM counting the number of blocks judged as an error is incremented by 1 (step S70). After that, judgment is made whether or not the value of U becomes "5" (step S71). When the value of U is not 5 (step S71/NO), the value of U is increased by 1 (step S72), and processing of steps S68, S69, and S70 is repeated. When the value of U becomes 5 (step S71/YES), judgment is made whether or not the value of EM is larger than 1.

In this embodiment, the number of errors allowable in decoding the X coordinate is set to 1. However, the number of errors allowable is not limited thereto. The number of errors allowable can be voluntarily set according to the coding method. When the number of errors is larger than 1 (step S73/YES), judgment is made that error occurrence frequency is high, and normal coding is not able to be performed, and N/A (not applicable) is outputted to the X coordinate (step S74). When the value of the counter EM is smaller than 1 (step S73/NO), the X coordinate is decoded from XA[U] and siftX (step S75)

Since a procedure of decoding the Y coordinate is performed in the similar procedure to of decoding the X coordinate, detailed descriptions thereof will be omitted.

The foregoing embodiment is a best mode for carrying out the invention. However, the invention is not limited thereto, and various modifications may be made within the scope of the invention. For example, while one block is set in the shape of a quadrangle in the foregoing embodiment, other shape such as a circle and a polygon may be used.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
    a reader that reads an image in which a background image and image data are combined, the background image having a plurality of blocks adjacent to each other that have a plurality of dots selectively arranged therein, the plurality of blocks including a synchronous block that has a dot arrangement of a synchronous code that is a reference for identifying the synchronous block, page blocks that have dot arrangements representing page numbers, and coordinate blocks that have dot arrangements representing coordinate values on a page, each block being an information unit that expresses a piece of information by a dot arrangement formed based on a number of dots and positions of those dots therein;
    a detector that overlays a block frame composed of the plurality of blocks on the read image, moves the block frame in relation to the image so that the number of dots detected in each block of the block frame becomes a given number, and detects block break points; and
    a decoder that decodes the dot arrangement in each block to regenerate information included therein.

2. The image processing apparatus according to claim 1, further comprising:
    a synchronous code detector that detects a synchronous code pattern having a dot arrangement that does not corresponds to that of another code pattern when rotated; and
    a rotator that rotates the code pattern by a given angle according to an orientation of the synchronous code detected.

3. The image processing apparatus according to claim 1, wherein, the synchronous block, each of the page blocks and each of the coordinate blocks on the page are the same size.

4. An information identifying method, comprising:
    reading an image in which a background image and image data are combined, the background image having a plurality of blocks adjacent to each other that have a plurality of dots selectively arranged therein, the plurality of blocks including a synchronous block that has a dot arrangement of a synchronous code that is a reference for identifying the synchronous block, page blocks that have dot arrangements representing page numbers, and coordinate blocks that have dot arrangements representing coordinate values on a page, each block being an information unit that expresses a piece of information by a dot arrangement formed based on a number of dots and positions of those dots therein;
    overlaying a block frame composed of the plurality of blocks on the read image, moving the block frame in relation to the image so that the number of dots detected in each block of the block frame becomes a given number, and detecting block break points; and
    decoding the dot arrangement in each block to regenerate information included therein.

* * * * *